US010878152B1

(12) United States Patent
Neves et al.

(10) Patent No.: US 10,878,152 B1
(45) Date of Patent: Dec. 29, 2020

(54) SINGLE-BIT LATCH OPTIMIZATION FOR INTEGRATED CIRCUIT (IC) DESIGN

(71) Applicant: International Business Machines Corporation, Armonk, NY (US)

(72) Inventors: Jose Neves, Poughkeepsie, NY (US); Adam Matheny, Hyde Park, NY (US); Alice Hwajin Lee, Belmont, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/567,031

(22) Filed: Sep. 11, 2019

(51) Int. Cl.
*G06F 30/00* (2020.01)
*G06F 30/3312* (2020.01)
*G06F 30/394* (2020.01)
*G06F 30/327* (2020.01)
*G06F 119/12* (2020.01)

(52) U.S. Cl.
CPC ........ *G06F 30/3312* (2020.01); *G06F 30/327* (2020.01); *G06F 30/394* (2020.01); *G06F 2119/12* (2020.01)

(58) Field of Classification Search
CPC .. G06F 30/3312; G06F 30/327; G06F 30/394; G06F 2119/12
See application file for complete search history.

(56) References Cited

U.S. PATENT DOCUMENTS

| | | | |
|---|---|---|---|
| 6,230,304 B1 | 5/2001 | Groeneveld et al. | |
| 6,440,780 B1 | 8/2002 | Kimura et al. | |
| 6,449,759 B1 | 9/2002 | Whitney et al. | |
| 6,701,507 B1 | 3/2004 | Srinivasan | |
| 6,769,104 B2 | 7/2004 | Rodgers et al. | |
| 7,051,310 B2 | 5/2006 | Tsao et al. | |
| 7,356,785 B2 | 4/2008 | Lu et al. | |
| 7,411,425 B2 | 8/2008 | Belluomini et al. | |
| 7,418,641 B2 | 8/2008 | Drake et al. | |
| 7,549,137 B2 | 6/2009 | Alpert et al. | |
| 7,551,985 B1 | 6/2009 | Chen et al. | |
| 7,598,774 B2 | 10/2009 | Belluomini et al. | |
| 7,624,366 B2 | 11/2009 | Alpert et al. | |
| 7,653,884 B2 | 1/2010 | Furnish et al. | |
| 7,685,552 B2 | 3/2010 | Ishihara et al. | |
| 7,795,943 B2 | 9/2010 | Toyonoh et al. | |
| 7,917,880 B2 | 3/2011 | Mak et al. | |

(Continued)

OTHER PUBLICATIONS

Transmittal Form PTO/SB/21, filed Mar. 17, 2020.

(Continued)

*Primary Examiner* — Naum Levin
(74) *Attorney, Agent, or Firm* — Cantor Colburn LLP; William Kinnaman

(57) ABSTRACT

Techniques for an IC design include placing latches between a source and one or more sinks in the IC design, and performing an iterative process for maximizing slack on one or more input nets and one or more output nets for each of the latches, minimizing an absolute difference of the slack. The IC design includes optimizing routing for the latches and placing a clock gating latch in the IC design designated to control a LCB of LCBs. The IC design includes placing LCB logic in the IC design to control a required number of the LCBs, and placing a local clock buffer controller in the IC design in proximity to the positions of the latches.

20 Claims, 27 Drawing Sheets

(56) References Cited

U.S. PATENT DOCUMENTS

| | | | |
|---|---|---|---|
| 8,010,926 | B2 | 8/2011 | Alpert et al. |
| 8,104,014 | B2 | 1/2012 | Puri et al. |
| 8,205,182 | B1 * | 6/2012 | Zlatanovici ........... G06F 30/327 |
| | | | 716/125 |
| 8,490,039 | B2 | 7/2013 | Agrawal et al. |
| 8,495,552 | B1 | 7/2013 | Cho et al. |
| 8,661,374 | B2 | 2/2014 | Vishweshwara et al. |
| 8,667,441 | B2 | 3/2014 | Alpert et al. |
| 8,677,299 | B1 | 3/2014 | Alpert et al. |
| 8,826,211 | B1 | 9/2014 | Sood et al. |
| 8,832,626 | B2 | 9/2014 | Agrawal et al. |
| 8,904,255 | B2 | 12/2014 | Tekumalla et al. |
| 8,954,912 | B2 | 2/2015 | Alpert et al. |
| 8,966,425 | B1 | 2/2015 | Eisenstadt et al. |
| 9,135,375 | B1 * | 9/2015 | Sood ...................... G06F 30/00 |
| 9,411,912 | B1 | 8/2016 | Sood et al. |
| 9,792,398 | B2 | 10/2017 | Xu et al. |
| 10,417,375 | B2 * | 9/2019 | Chung .................. G06F 16/275 |
| 2001/0010090 | A1 | 7/2001 | Boyle et al. |
| 2003/0135836 | A1 | 7/2003 | Chang et al. |
| 2004/0230933 | A1 | 11/2004 | Weaver et al. |
| 2006/0041852 | A1 | 2/2006 | Drumm et al. |
| 2008/0148203 | A1 | 6/2008 | Alpert et al. |
| 2008/0168411 | A1 | 7/2008 | Mang et al. |
| 2008/0276212 | A1 | 11/2008 | Albrecht |
| 2010/0064264 | A1 | 3/2010 | Amundson |
| 2012/0124539 | A1 | 5/2012 | Alpert et al. |
| 2013/0326451 | A1 | 12/2013 | Cho et al. |
| 2014/0070847 | A1 | 3/2014 | Elkin et al. |
| 2014/0084890 | A1 | 3/2014 | Philip |
| 2016/0188774 | A1 | 6/2016 | Adya et al. |

OTHER PUBLICATIONS

Held, S. et al., "Post-Routing Latch Optimization for Timing Closure," Research Institute for Discrete Mathematics, Bonn, Germany, 6 pages.

IBM "List of IBM Patents or Patent Applications Treated as Related; (Appendix P)", Filed Sep. 12, 2019, 2 pages.

Jesse Surprise et al., "Improved Clock Gating Latch Placement," U.S. Appl. No. 16/567,134, filed Sep. 11, 2019.

Jesse Surprise et al., "Improved Local Clock Buffer Controller Placement and Connectivity," U S. Appl. No. 16/567,128, filed Sep. 11, 2019.

Jose Neves et al., "Multi-Fanout Latch Placement Optimization for Integrated Circuit (IC) Design," U.S. Appl. No. 16/567,050, filed Sep. 11, 2019.

Jose Neves et al., "Net Routing for Integrated Circuit (IC) Design," U.S. Appl. No. 16/567,035, filed Sep. 11, 2019.

Jung, J. et al., "Integrated Latch Placement and Cloning for Timing Optimization," ACM Transactions on Design Automation of Electronic Systems, Feb. 2019, vol. 24, No. 2, Article 22, 17 pages.

MacQueen et al., "Some Methods for classification and Analysis of Multivariate Observations," Proceedings of 5th Berkeley Symposium on Mathematical Statistics and Probability, University of California Press, 1967, pp. 281-297.

Papa, D. et al., "Physical Synthesis With Clock-Network Optimization for Large Systems on Chips," IEEE Computer Society, Jul./Aug. 2011, Big Chips, 12 pages.

Viswanathan, "Placement techniques for the physical synthesis of nanometer-scale integrated circuits," Iowa State University, Graduate Theses and Dissertations, 20758, 2009, 160 pages.

* cited by examiner

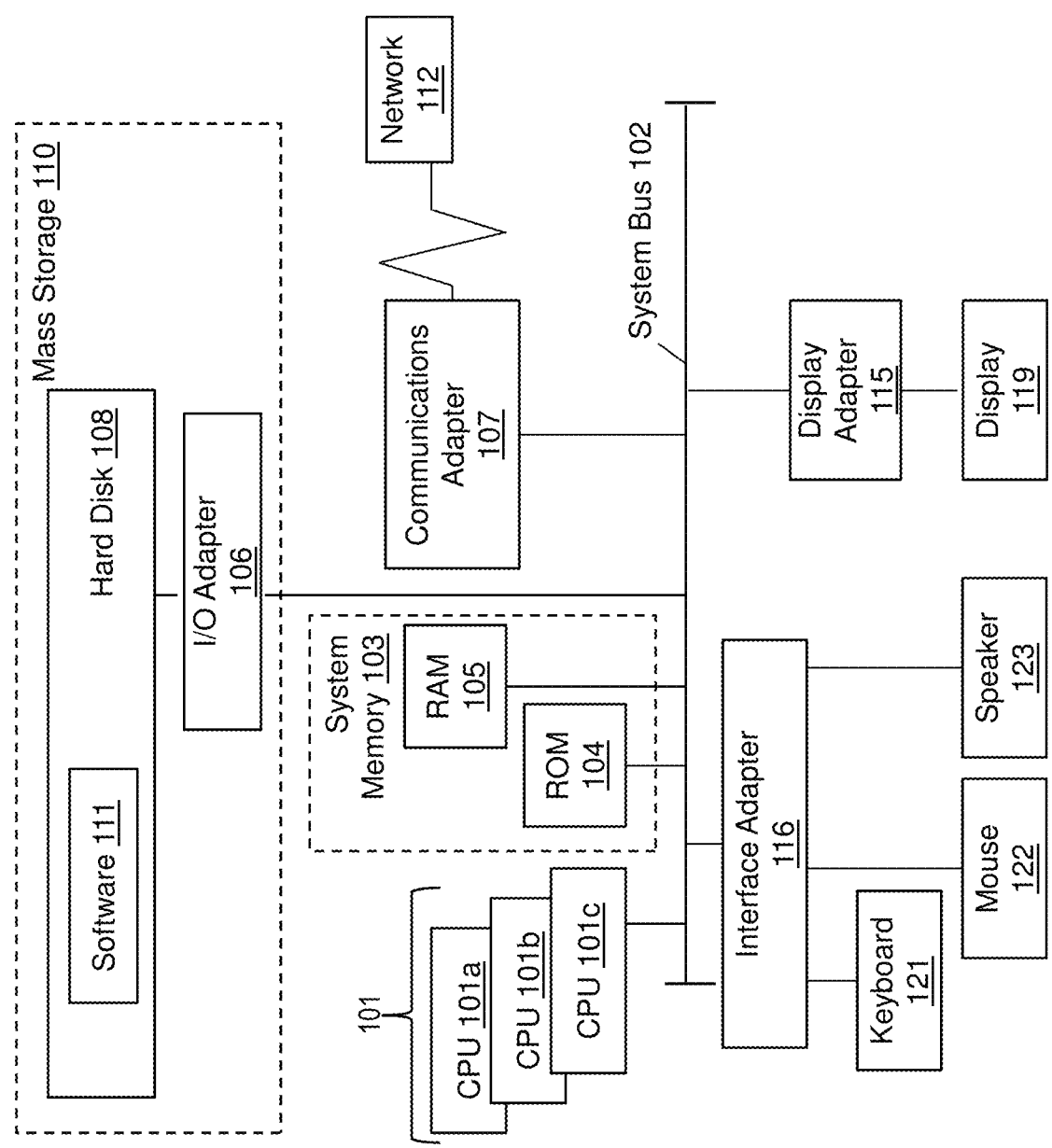

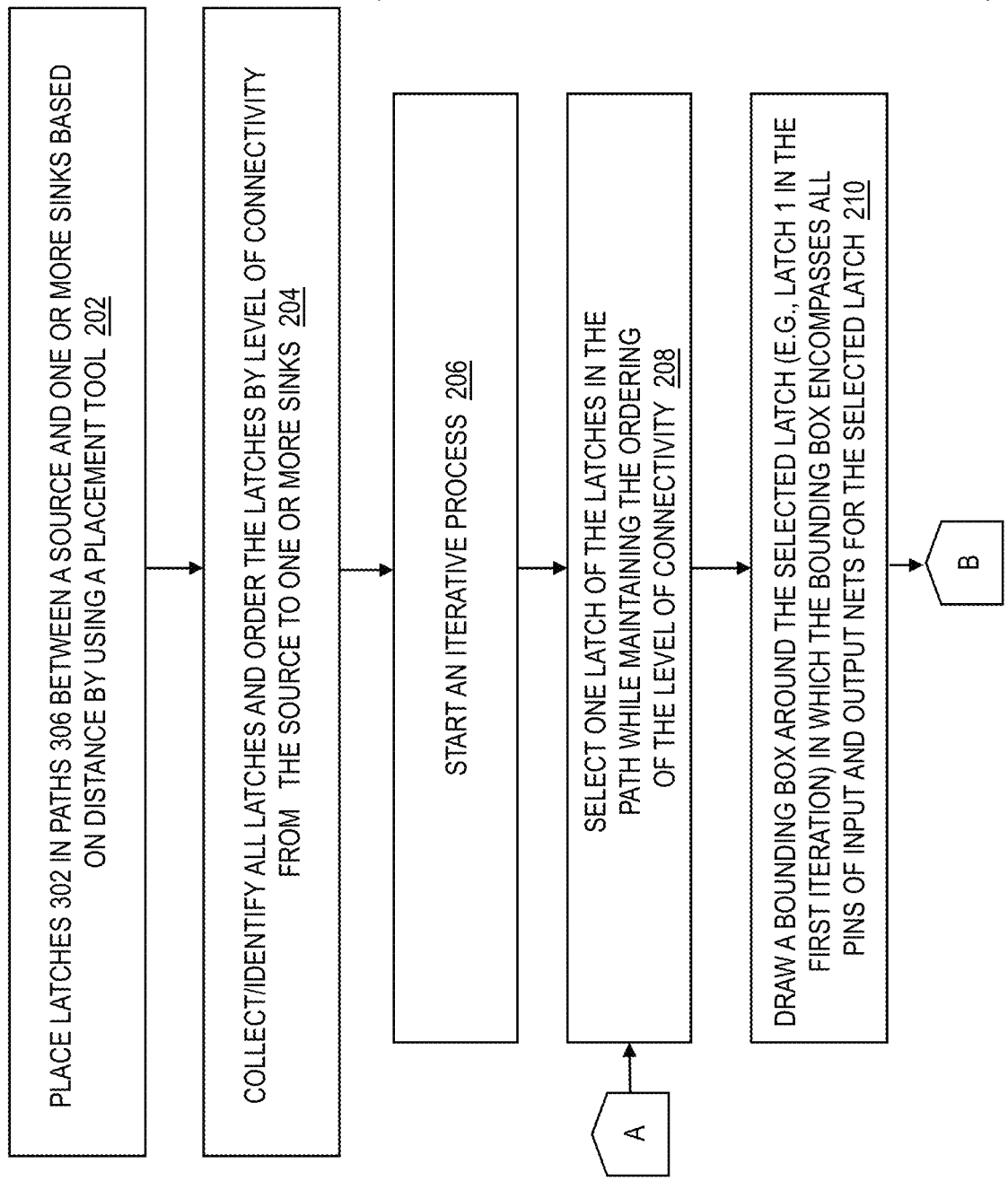

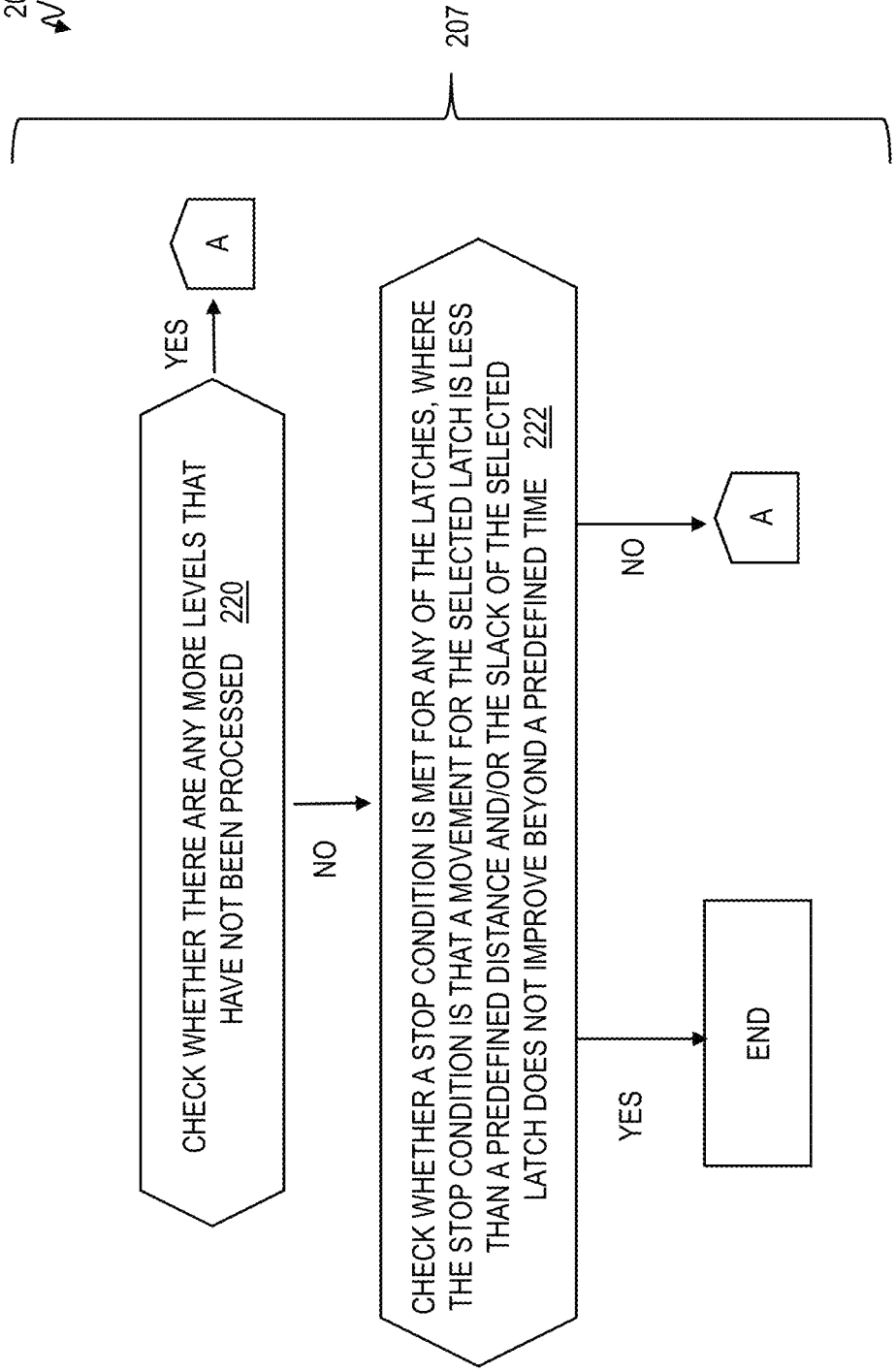

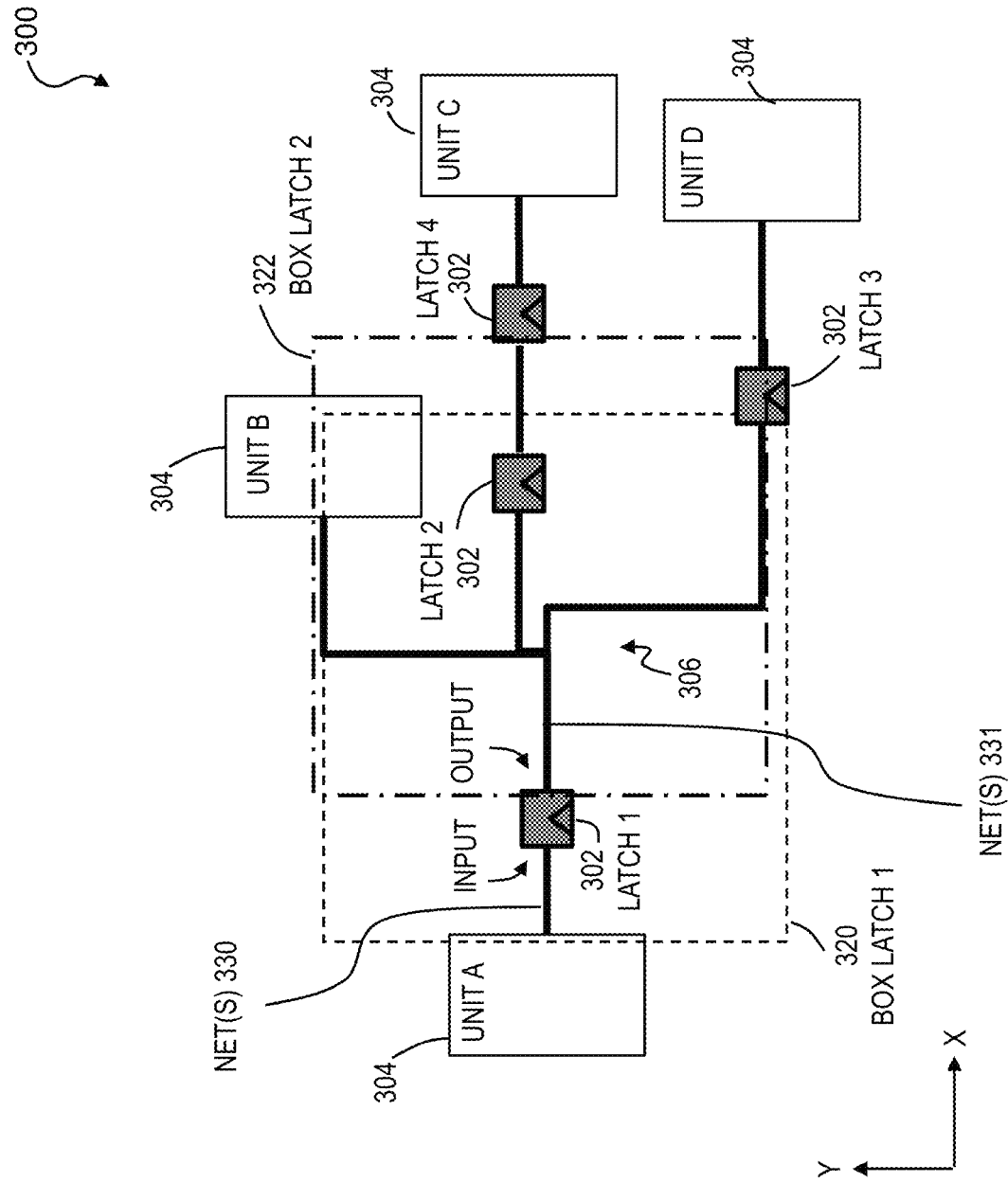

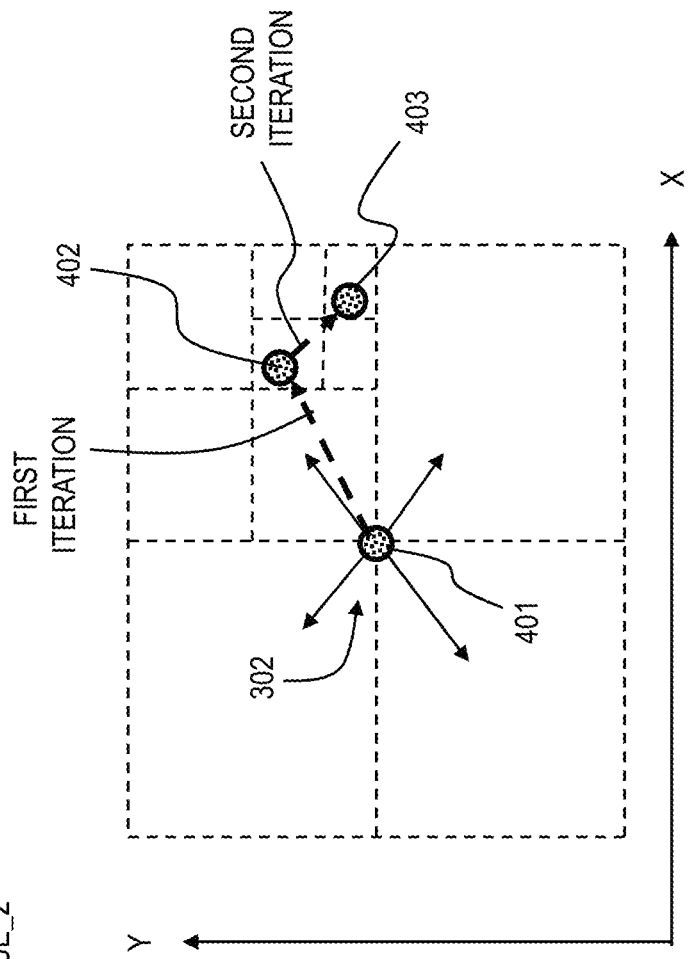

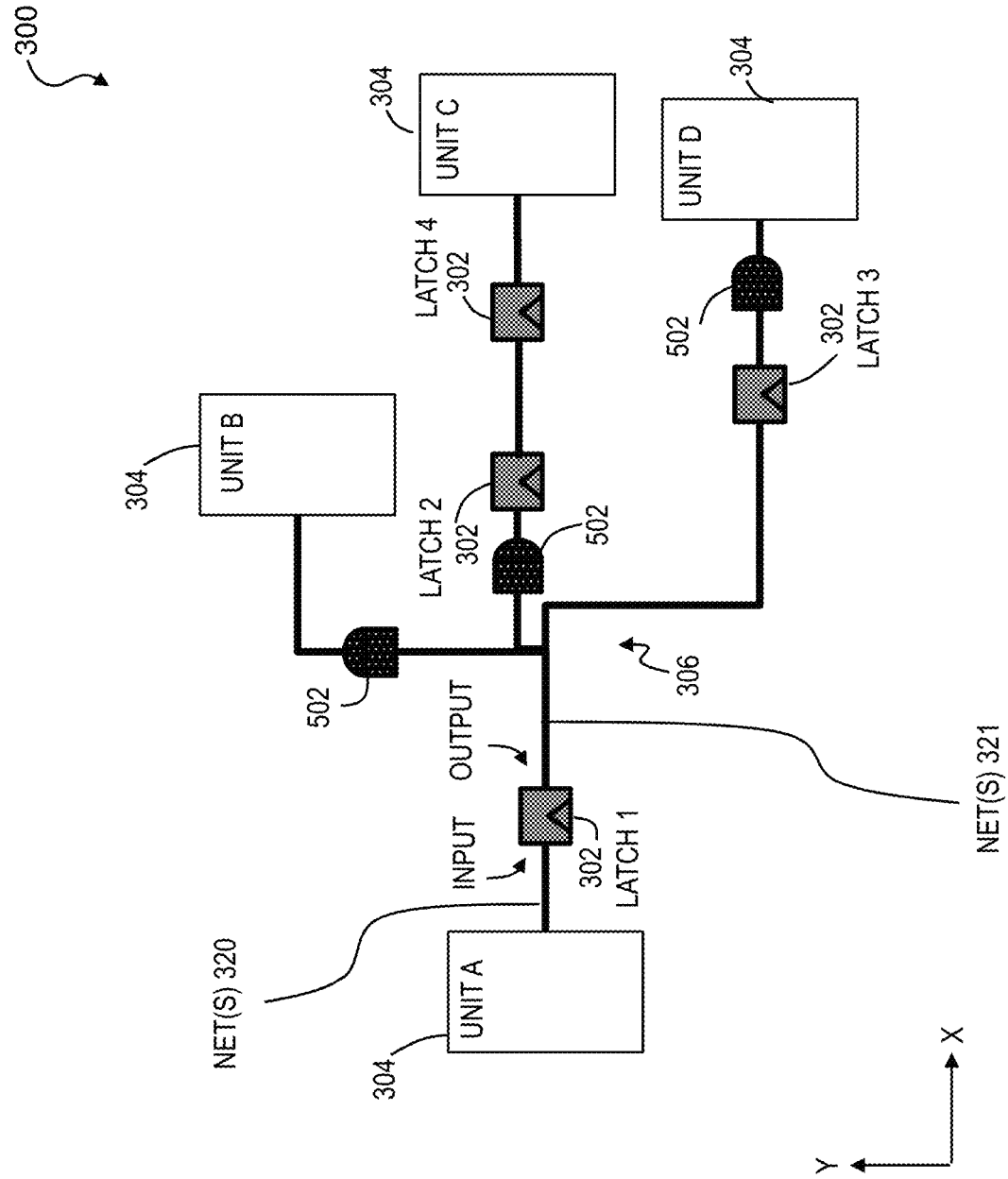

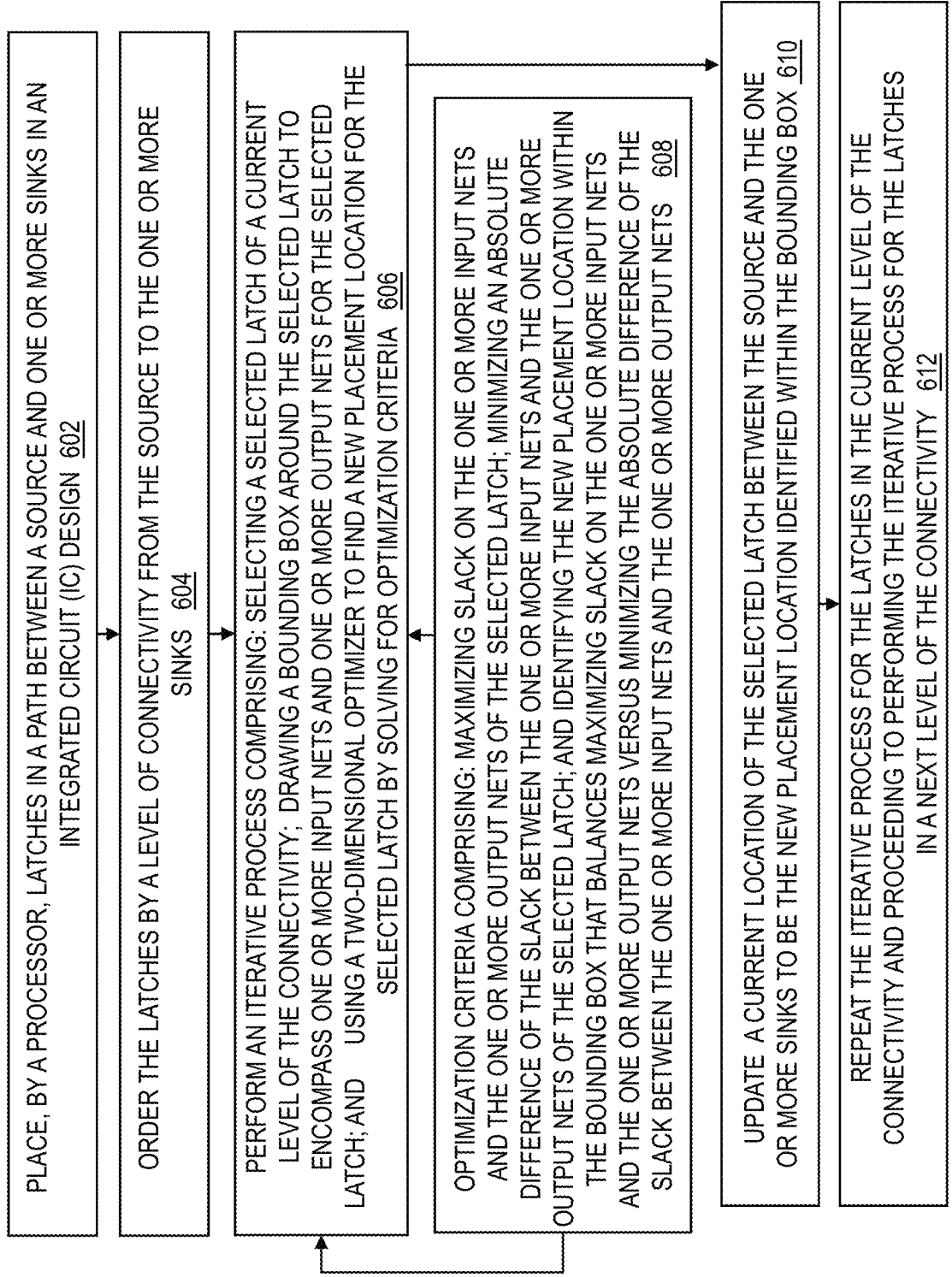

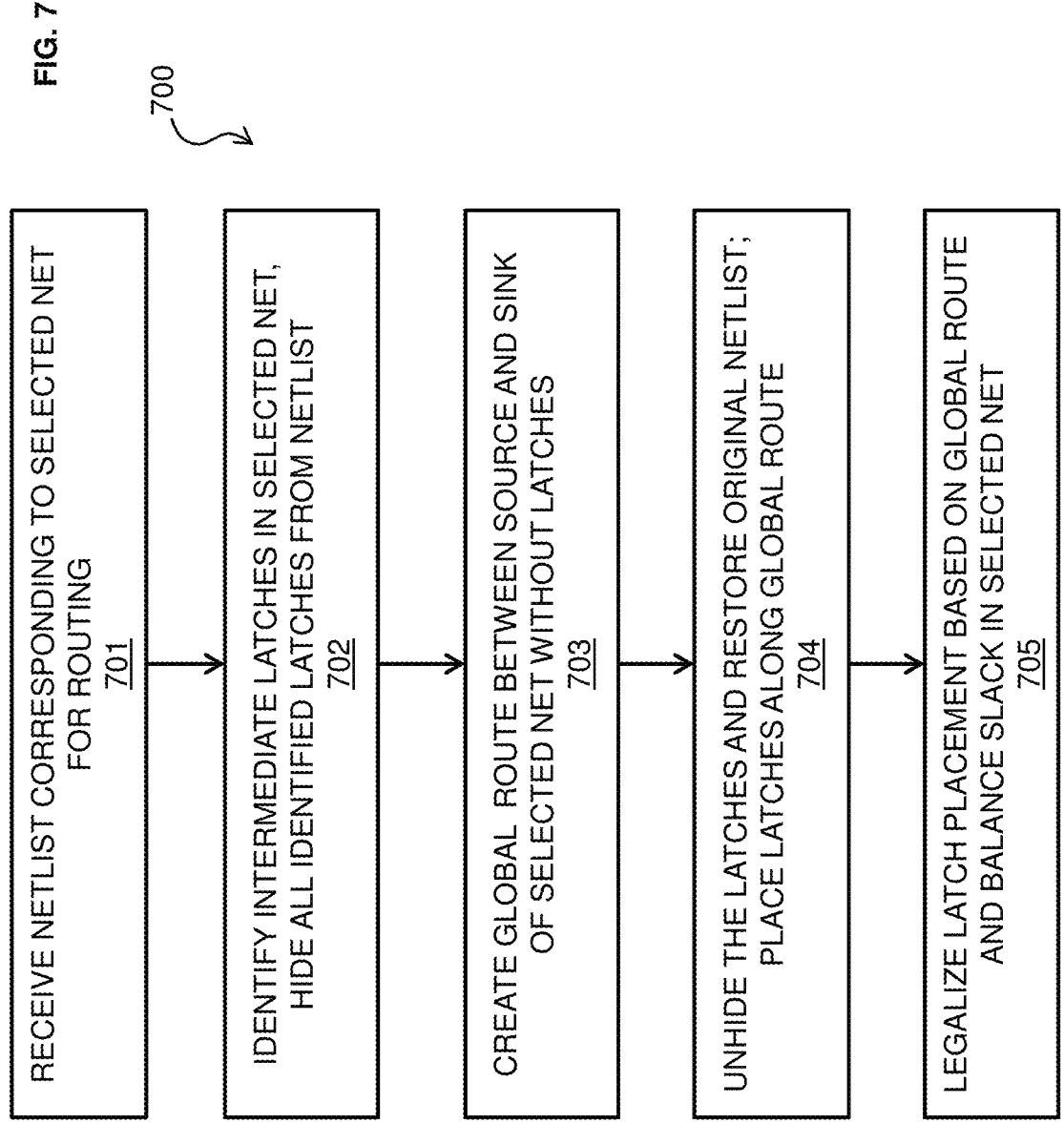

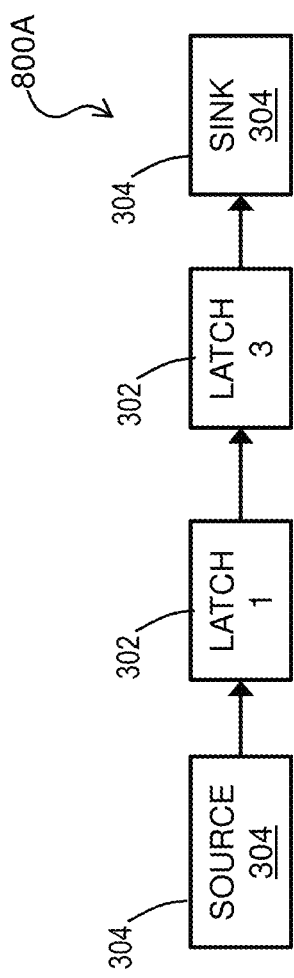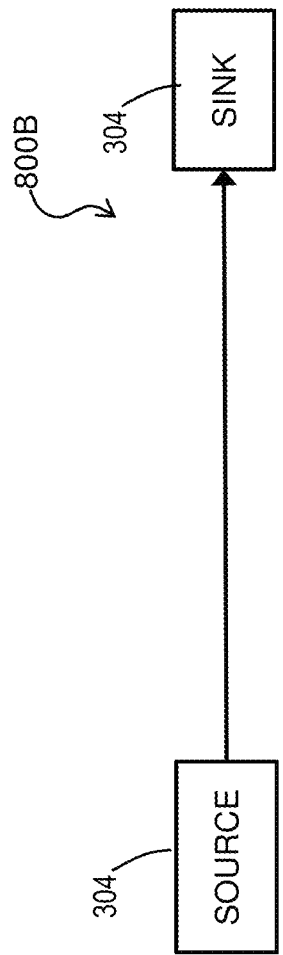
FIG. 8A
FIG. 8B

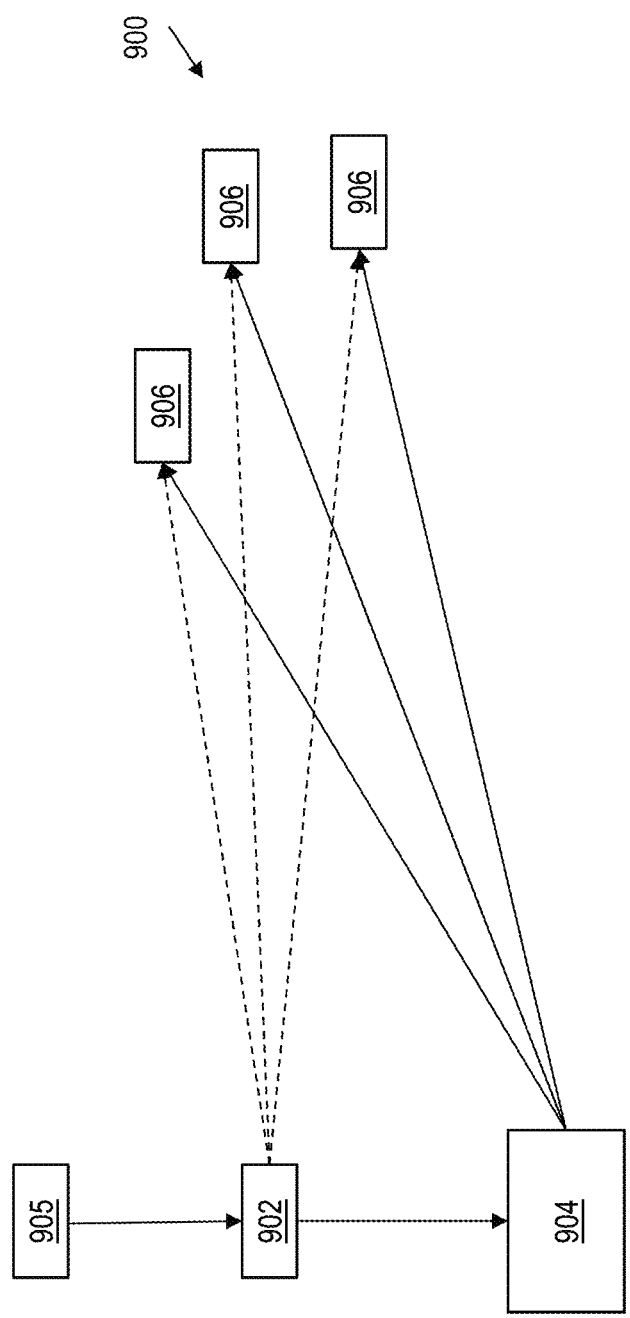

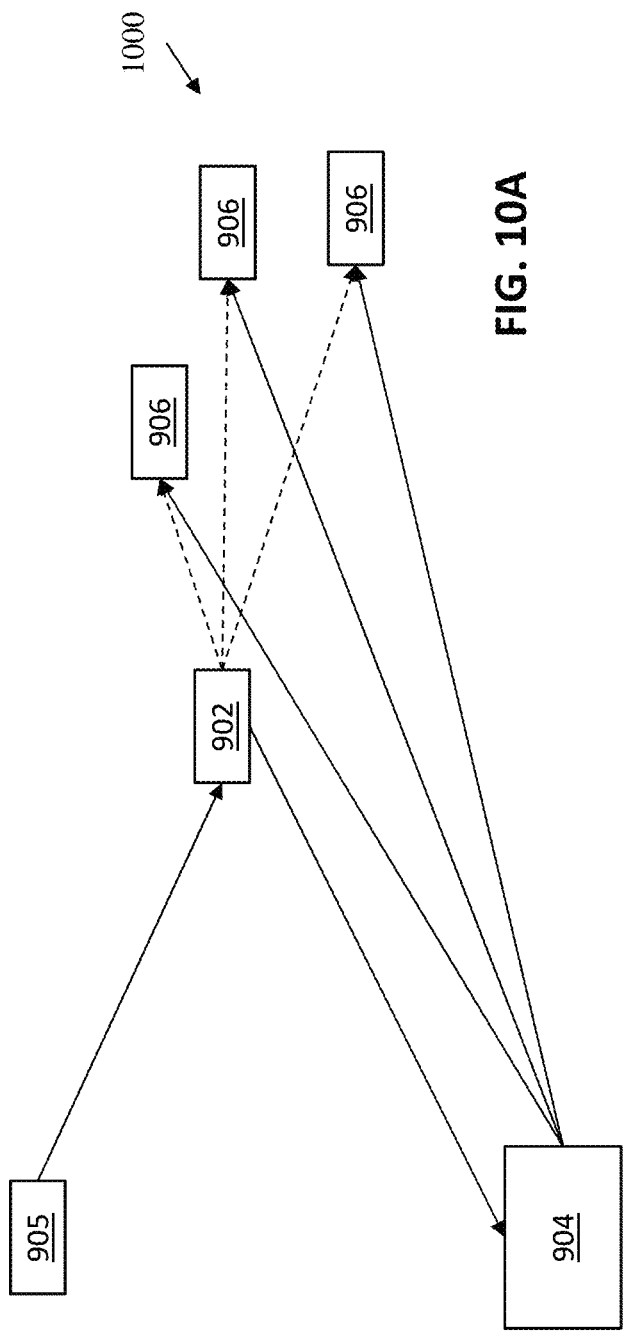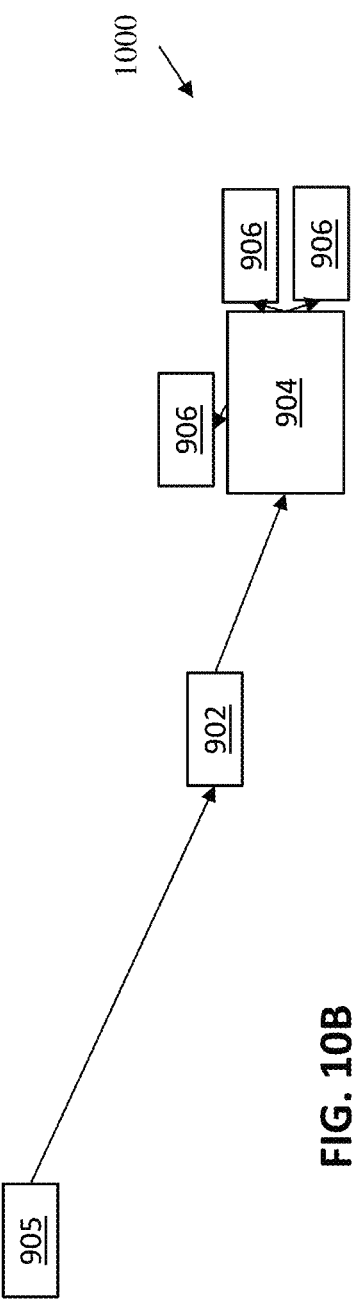

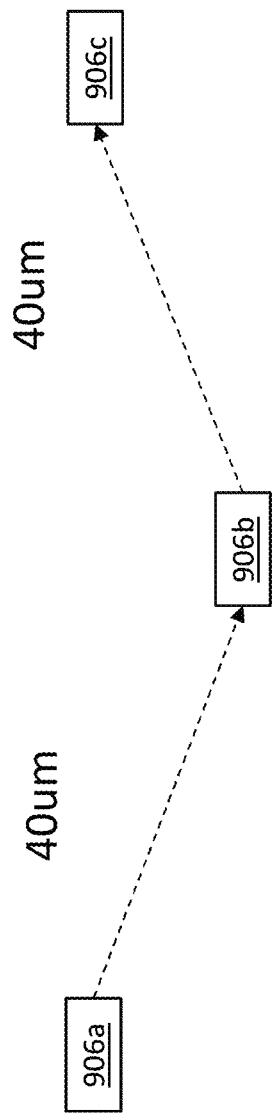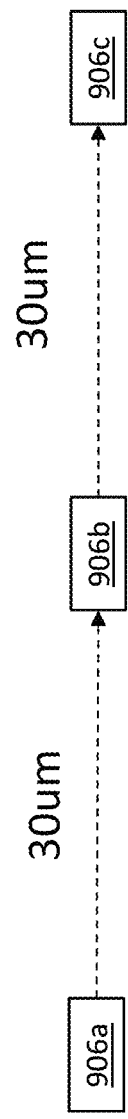
FIG. 12A
FIG. 12B

SINGLE-BIT LATCH OPTIMIZATION FOR INTEGRATED CIRCUIT (IC) DESIGN

BACKGROUND

The present invention generally relates to integrated circuits (ICs), and more specifically, to single-bit latch optimization for an IC design.

An IC chip may include a large number of electronic components that are fabricated by layering several different materials on a silicon base or wafer. The design of an IC transforms a circuit description into a geometric description which is known as a layout. The process of converting the functional specifications of an electronic circuit into a layout is called the physical design. The objective of the physical design is to determine an optimal arrangement of devices in a plane or in a three-dimensional space, and an efficient interconnection or routing scheme between the devices to obtain the desired functionality.

An IC chip includes elements, and connections between the elements, formed on a surface of a semiconductor substrate. The IC may include a large number of elements and require complex connections between the elements. Millions of circuits may need to be physically placed and connected on the chip. Placement may be a relatively time consuming process because the actual process of designing, placing, and connecting the circuits on the chip can affect the performance and timing requirements of the chip. Therefore, the design process affects placement of wire circuits or nets into a functional chip.

SUMMARY

Embodiments of the present invention are directed to single-bit latch placement optimization for an integrated circuit (IC) design. A non-limiting example computer-implemented method includes placing, by a processor, latches between a source and one or more sinks in an integrated circuit (IC) design, a netlist including the latches. The method includes performing an iterative process which includes drawing a bounding box for each of the latches, maximizing slack on one or more input nets and one or more output nets for each of the latches, minimizing an absolute difference of the slack between the one or more input nets and the one or more output nets, and identifying a new placement location within the bounding box that balances maximizing the slack versus minimizing the absolute difference of the slack. The method includes optimizing routing which includes hiding the latches between the source and one or more sinks from the netlist, creating a global route in the IC design between the source and the one or more sinks without the latches, restoring the latches to the netlist, and placing the latches along the global route. Also, the method includes placing a clock gating latch in the IC design designated to control a local clock buffer (LCB) of LCBs by: determining the latches to be controlled by the LCB, determining positions of the latches, placing the clock gating latch a position determined based on the positions of the latches, and placing the LCB in proximity to the position of the clock gating latch such that a timing requirement met. Further, the method includes placing LCB logic in the IC design to control a required number of the LCBs, and placing a local clock buffer controller in the IC design in proximity to the positions of the latches.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 1 is a block diagram of an example computer system for use in conjunction with one or more embodiments of a multi-fanout latch placement optimization for an integrated circuit (IC) design;

FIG. 2A is a flow diagram of a process for multi-fanout latch placement optimization for an IC design in accordance with one or more embodiments of the present invention;

FIG. 2C continues the flow diagram in FIGS. 2A and 2B of the process for multi-fanout latch placement optimization for the IC design in accordance with one or more embodiments of the present invention;

FIG. 3 is a block diagram of components of a system for multi-fanout latch placement optimization for an IC design in accordance with one or more embodiments of the present invention;

FIG. 4 is a block diagram of example movement in the system for multi-fanout latch placement optimization for the IC design in accordance with one or more embodiments of the present invention;

FIG. 5 is a block diagram of components of a system for multi-fanout latch placement optimization for an IC design in accordance with one or more embodiments of the present invention;

FIG. 6 is a flow diagram of a computer-implemented method for multi-fanout latch placement optimization for an IC design in accordance with one or more embodiments of the present invention;

FIG. 7 is a flow diagram of a process for net routing for an IC design in accordance with one or more embodiments of the present invention;

FIG. 8A is a block diagram of components of a system for net routing for an IC design in accordance with one or more embodiments of the present invention;

FIG. 8B is a block diagram of components of a system for net routing for an IC design in accordance with one or more embodiments of the present invention;

FIG. 9 is a block diagram for a system or layout of an IC design having a local clock buffer and latches in accordance with one or more embodiments of the present invention;

FIG. 10A is a block diagram for a system or layout of an IC design having a local clock buffer and latches including a clock gating latch placed in accordance with one or more embodiments of the present invention;

FIG. 10B is a block diagram for a system or layout of an IC design including a clock gating latch and an local clock buffer placed in accordance with one or more embodiments of the present invention;

FIG. 12A depicts an example relative positioning of three latches in accordance with one or more embodiments of the present invention;

FIG. 12B depicts an example repositioning of the relative position of three latches to minimize net lengths in accordance with one or more embodiments of the present invention;

DETAILED DESCRIPTION

Figure 2B:
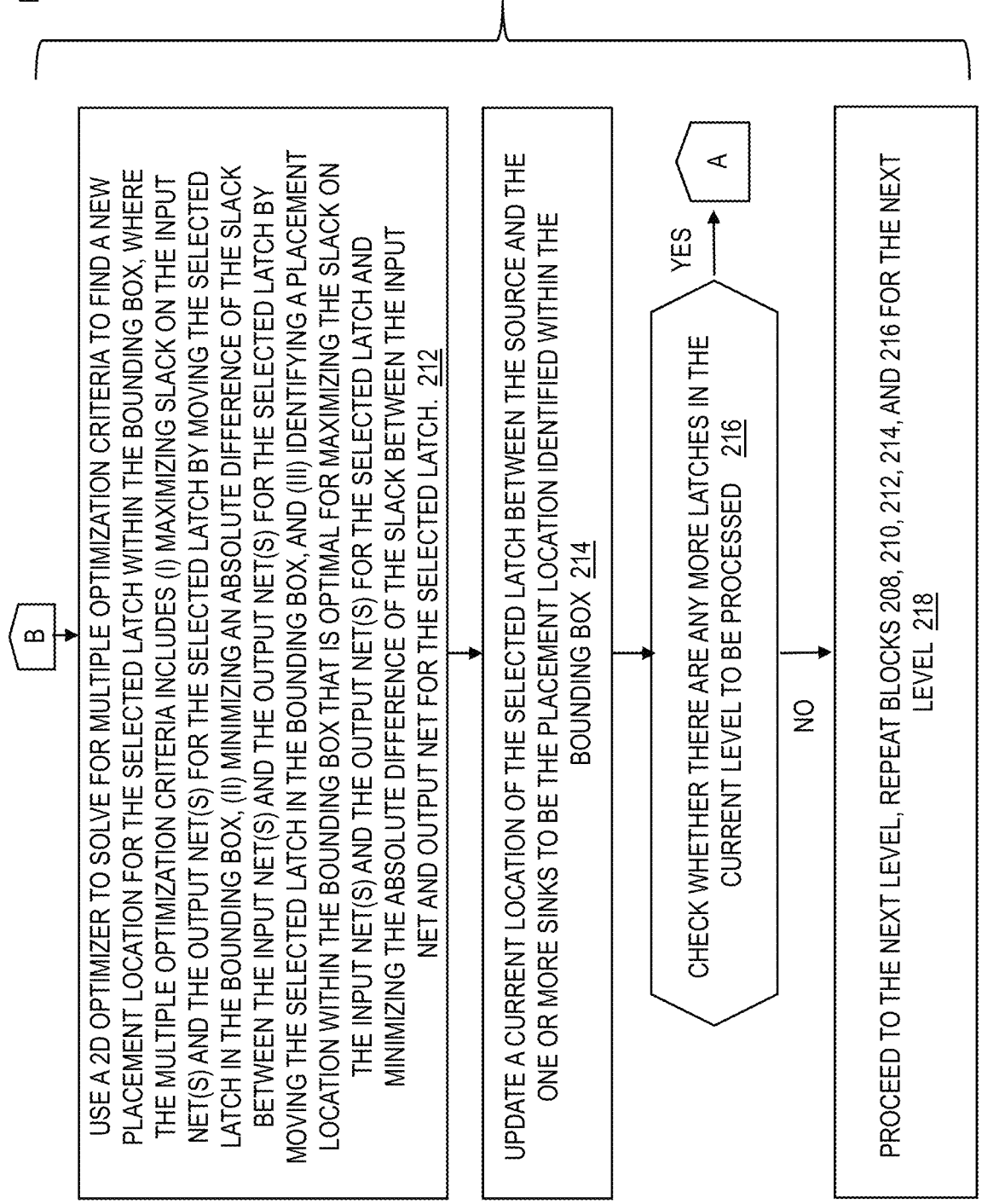
FIG. 2B continues the flow diagram in FIG. 2A of the process for multi-fanout latch placement optimization for the IC design in accordance with one or more embodiments of the present invention.

One or more embodiments of the present invention provide multi-fanout latch placement optimization for an IC design. An IC may include a relatively large number of latches and gates which are connected between endpoints such as a source and one or more sinks. An optimization is provided for the placement or movement of latches and gates between endpoints based on optimization criteria. The optimization can be used for from endpoint to endpoint nets (e.g., from a source to one sink) as well as for multi-sink nets (e.g., from a source to multiple sinks). One or more embodiments of the invention may use a multi-dimensional optimizer, use one pass optimization, include general purpose gates not just latches, and work with multiple timing modes from virtual mode to detailed mode where virtual mode allows movement with automatic wire tagging.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

FIGS. 2A, 2B, and 2C illustrate a process flow diagram of a method 200 for multi-fanout latch placement optimization for an IC design in accordance with one or more embodiments of the present invention. Reference can be made to FIG. 3 which illustrates a block diagram of components of a system 300 for multi-fanout latch placement optimization for an IC design in accordance with one or more embodiments of the present invention. The system 300 can be representative of an IC design (e.g., layout) for an integrated circuit.

Method 200 of FIGS. 2A, 2B, and 2C may be implemented in conjunction with any appropriate computer system, such as computer system 100 of FIG. 1. Embodiments of method 200 may be implemented in software 111 and may operate on data stored in mass storage 110 and/or system memory 103. Although latches are discussed for illustrative purposes and not limitation, it should be appreciated that the method 200 is not limited to latches but applies to latches, gates, and various combinations of latches and gates. At block 202 of method 200, the computer system 100 is configured to place latches 302 (and/or gates 502 depicted in FIG. 5) in paths 306 between a source and one or more sinks based on distance, for example, by using a placement tool. The paths 306 are the wiring/nets connecting units 304 to other units 304 with intermediate components such as latches 302, gates 502, etc., in between. The units 304 may be a macro or an intellectual property (IP) unit in the IC design.

At block 204, the computer system 100 is configured to collect/identify all latches 302 (and/or gates 502) and order the latches 302 (and/or gates 502) by level of connectivity from the source to one or more sinks. In the example system 300, the source is unit A (e.g., unit 304) and the sinks are units B, C, D (e.g., other units 304). In some embodiments of the invention, there may be one source connected to one sink without the output of the source fanning out to more than one sink. The current or signal travels from the source to sink, such that the one or more sinks receive the output of the source. Ordering the latches 302 (and/or gates 502) by level of connectivity includes ranking latches closest to the source (e.g., unit A) in a lowest level/first level through ranking latches closest to the sink in a highest level/last level, while latches in between lowest level/first level and highest level/last level are ranked in intermediary levels. Accordingly, latch 1 is in level 1 (because it is the closest to the source (e.g., unit A)) in FIG. 3, latch 2 and latch 3 are in level 2 (which is the next closest to the source), and latch 4 is in level 3 (because latch 4 is the furthest from the source (e.g., unit A) and because when walking from the source (e.g., unit A) to sink (e.g., unit C), there are three latches in series); however, when walking/proceeding from the same source (e.g., unit A) to the sink in unit D, there are only two latches in series (e.g., latch 1 and latch 3) resulting in two levels.

At block 206, the computer system 100 is configured to start an iterative process 207. At block 208 of iterative process 207, the computer system 100 is configured to select one latch (and/or gate 502) of the latches 302 (and/or gates 502) in the path 306 while maintaining the ordering of the level of connectivity. Latches and/or gates are selected based on a slack criteria (e.g., slack<threshold) and/or distance in balance criteria. According to the order of level of connectivity, the computer system 100 selects latch 1 (and/or gate) of level 1 which is closest to unit A (i.e., the source). At block 210 of iterative process 207, the computer system 100 is configured to draw a bounding box around the selected latch (e.g., latch 1 in the first iteration) in which the bounding box encompasses all pins of input and output nets for the selected latch. For example, a bounding box 320 (e.g., bounding box latch 1) is drawn around latch 1 to include the input nets/wires 330 and output nets/wires 331 connected to latch 1. For explanation purposes, an example bounding box 332 is also shown for latch 2, but bounding boxes are not illustrated for latches 3 and 4 although bounding boxes are utilized when latches 3 and 4 are processed by the computer system 100. The bounding is redrawn for every iteration since the latches move, moving the sinks, or edges of the box. After going through all levels of latches at least once (e.g., after at least on iteration), all latches may move to a new location. As such, the bounding box of latch 1 has new dimensions in the next iteration (as opposed to the previous iteration) because latches 2 and 3 may have moved to a new position.

At block 212 of iterative process 207, the computer system 100 is configured to use a two-dimensional (2D) optimizer to solve for multiple optimization criteria to find a new placement location for the selected latch (and/or gate) within the bounding box (e.g., bounding box 320 for latch 1), where the multiple optimization criteria includes (i) maximizing slack on the input net(s) and the output net(s) for the selected latch by moving the selected latch in the bounding box, (ii) minimizing an absolute difference of the slack between the input net(s) and the output net(s) for the selected latch by moving the selected latch in the bounding box, and/or (iii) identifying a placement location within the bounding box that is optimal for maximizing the slack on the input net(s) and the output net(s) for the selected latch and minimizing the absolute difference of the slack between the input net and output net for the selected latch. The software 111 may incorporate and/or utilize a multi-dimensional optimization algorithm. Maximizing slack on the input net(s) 330 means moving the selected latch 302 in the x and y directions until the input slack on the input net(s) 330 is largest, such as 20 picoseconds (ps), and maximizing slack on the output net(s) 331 means moving the selected latch in the x and y directions until the output slack on output net(s) is largest, such as 30 ps. The absolute difference between the input slack on input net(s) 330 and output slack on output net(s) 331 is |20−30|=10 ps. To minimize the absolute difference, the selected latch 302 is further moved in the x and y directions within the bounding box until the input slack is about equal, nearly equal, and/or equals the output slack. For example, the selected latch can be moved until the input slack on input net(s) 330 is about 25 ps and output slack on output net(s) 331 is about 25 ps, which has an absolute difference of 0.

At block 214 of iterative process 207, the computer system 100 is configured to update a current location of the selected latch between the source and the one or more sinks to be the placement location identified within the bounding box (e.g., bounding box 320 for latch 1).

At block 216 of iterative process 207, the computer system 100 is configured to check whether there are any more latches in the current level being processed (e.g., current level is level 1 at the start of the iterative process). When there are more latches 302 to be processed in the current level of block 216, the computer system 100 is configured to repeat blocks 208-216 for all the latches 302 in the current level. When there are no more latches 302 to be processed in the current level, the iterative process 207 flows to block 218; at block 218 of iterative process 207, the computer system 100 is configured to proceed to the next level (e.g., level 2 for latches 2 and 3, respectively) for processing and repeat blocks 208, 210, 212, 214, and 216 for the next level (e.g., level 2 for latch 2 using bounding box 322 and then latch 3). It is noted that latch 3, also in level 2, requires its own bounding box (e.g., not shown) for conciseness prior to optimizing the location.

At block 220 of iterative process 207, the computer system 100 is configured to check whether there are any more levels that have not been processed for the current iteration. If there are more levels that have not been processed in block 220, the computer system 100 is configured to continue processing for each successive level through the level driving the sinks (i.e., last level) and proceeds back to block 208. The level driving the sinks is level 3 in this example, which includes latch 4 driving unit C (e.g., sink). It is noted that latch 1 drives unit B but latch 1 has already been processed in the first level. When there are not any more levels that need to be processed for the current iteration, the flow proceeds to block 222. For example, if the current iteration is the first iteration and there are not any more levels of connectivity to process, this means it will be time for the second iteration to be executed based on the results of block 222.

At block 222 of iterative process 207, the computer system 100 is configured to check whether a stop condition is met for any of the latches 302, where the stop condition is met when the movement for the selected latch is less than a predefined distance/value (e.g., output slack<the predefined distance/value) and/or the slack of the selected latch does not improve beyond a predefined time/value (e.g., slack improvement<predetermined time/value). When the stop condition is met at block 220, the iterative process 207 ends. When the stop condition at block 220 is not met, the computer system 100 is configured to return back to level 1 and repeat the iterative process of blocks 208-220 which will continue through the last level (e.g., level 3). All latches move at most once before the software 111 of computer system 100 returns to the first latch and moves it again. Latches and gates that meet constraints of the stop condition stay in place during the subsequent iteration. In one or more embodiments of the invention, when the condition for stopping is met any latches meeting the stop condition are skipped in any subsequent iterations. In one or more embodiments of the invention, the stop condition at block 220 can be met for any single latch and the process ends for all latches 302. In one or more embodiments of the invention, the stop condition at block 220 can be met for one latch (e.g., latch 1) but not the other latches (e.g., latches 2, 3, 4), and the iterative process 207 will continue for the other latches but stops/skips for any latch meeting the stop condition.

FIG. 4 illustrates a block diagram of example movement in the system 300 for multi-fanout latch placement optimization for the IC design in accordance with one or more embodiments of the present invention. Some details of the system 300, such as latches 302, units 304, paths 306, etc.,) are omitted for conciseness but it should be appreciated that the omitted details are shown in FIG. 3. The initial/current location of the selected latch 302 may start at location 401, and the first iteration of the iterative process 207 of method 200 begins for the selected latch 302. After completing the first iteration of the iterative process 207, the latch 302 has moved from location 401 to location 402. Now, the current location of the selected latch 302 starts at location 402, and the second iteration of the iterative process 207 of method 200 begins for the selected latch 302. After completing the second iteration of the iterative process 207, the latch 302 has moved from location 402 to location 403, and the second iteration for the selected latch stops because a stop condition has been met. As noted above, other latches 302 can continue the iterative process 207 of method 200 in one or more embodiments until each latch respectively meets the stop condition. For example, the stop condition is met when there is no movement for the latch (e.g., in the x or y direction), the slack on one or more input nets or one or more output nets of the latch does not improve beyond a predetermined value, and/or the movement for the latch (e.g., in the x or y direction) is less than are predetermined value.

FIG. 5 illustrates a block diagram of the system 300 for latch and gate multi-fanout latch placement optimization for the IC design in accordance with one or more embodiments of the present invention. Some details of the system 300 are omitted for conciseness and gates 502 are additionally shown but it should be appreciated that the omitted details would be incorporated appropriately. The gates 502 can be any type of logic gate, such as AND gates, OR gates, NAND gates, NOR gates, buffers, and/or any other gate that can be moved by the optimization flow.

Each gate 502 is treated similarly as discussed for latches 302 by the software 111 of computer system 100, and each gate 502 is analogously moved within a bounding box, which is omitted in FIG. 5 and illustrated in FIG. 3, as discussed herein for latches 302 unless a particular gate has its placement fixed. Moreover, the gates 502 are processed during method 200 just as discussed above for the latches 302. Additionally, processing of method 200 for the gates 502 can be run in virtual timing mode which allows for wire tagging to be performed as well. Virtual timing mode allows for movement of the gates 502 (and latches 302) with automatic tagging that associates nets with wire codes that have specific electrical properties.

FIG. 6 is a flow diagram of a computer-implemented method 600 for multi-fanout latch placement optimization for an IC design in accordance with one or more embodiments of the present invention. Computer system 100 can be utilized to perform the method 600, and the method 600 may be implemented in software 111. Reference can be made to any of the figures discussed herein. At block 602, the method 600 includes placing, by a processor (such as processors 101 of computer system 100), latches 302 in a path between a source (e.g., unit 304 such as unit A) and one or more sinks (e.g., units 304 such as units B, C, D) in an integrated circuit (IC) design (e.g., such as system 300). At block 604, the computer system 100 is configured to order the latches 302 by a level of connectivity from the source to the one or more sinks.

At block 606, the computer system 100 is configured to perform an iterative process 207 including: selecting a selected latch 302 of a current level of the connectivity; drawing a bounding box around the selected latch 302 to encompass one or more input nets and one or more output nets (e.g., input nets/wires 330 and output nets/wires 331) for the selected latch 302; using a two-dimensional optimizer (e.g., which can be integrated in software 111 and/or utilized by software 111) to find a new placement location for the selected latch 302 by solving for optimization criteria. At block 608, the optimization criteria includes maximizing slack on the one or more input nets and the one or more output nets of the selected latch 302; minimizing an absolute difference of the slack between the one or more input nets and the one or more output nets of the selected latch 302; and identifying the new placement location within the bounding box that balances maximizing the slack on the one or more input nets and the one or more output nets versus minimizing the absolute difference of the slack between the one or more input nets and the one or more output nets.

At block 610, the computer system 100 is configured to update a current location (e.g., location 401) of the selected latch 302 between the source and the one or more sinks to be the new placement location (e.g., location 402, location 403, etc.,) identified within the bounding box (e.g., bounding box 320, bounding box 322, etc.). At block 612, the computer system 100 is configured to repeat the iterative process 207 for the other latches 302 (which have not been processed yet during the current iteration) in the current level of the connectivity and proceed to performing the iterative process 207 for the latches 302 in a next level of the connectivity.

In one or more embodiments of the invention, ordering the latches 302 (and gates 502) by the level of connectivity from the source to the one or more sinks includes ranking the latches in a sequential order of levels starting with the latches 302 closest to the source being in a lowest level through the latches closest to the sink being in a highest level, while the latches in between the lowest level and the highest level are ranked in intermediary levels. Maximizing slack on the one or more input nets and the one or more output nets of the selected latch includes moving the selected latch 302 in two dimensions (e.g., x and y directions) within the bounding box to increase the slack. Minimizing the absolute difference of the slack between the one or more input nets and the one or more output nets of the selected latch comprises moving the selected latch in two dimensions (e.g., x and y directions) within the bounding box to equalize the absolute difference of the slack such that the slack on the one or more input nets and the one or more output nets of the selected latch is about equal. Identifying the new placement location (e.g., locations 402, 403, etc.) within the bounding box that balances maximizing the slack on the one or more input nets and the one or more output nets versus minimizing the absolute difference of the slack between the one or more input nets and the one or more output nets includes moving the selected latch in two dimensions (e.g., x and y directions) within the bounding box while accounting for both maximizing the slack and minimizing the absolute difference of the slack. When maximizing the slack and minimizing the absolute difference of the slack are not able to be balanced, the selected latch is configured to be moved to optimize one of maximizing the slack or minimizing the absolute difference of the slack at an expense of the other one.

In one or more embodiments of the invention, repeating the iterative process 207 for the latches 302 in the current level of the connectivity and proceeding to perform the iterative process for the latches in a next level of the connectivity comprises checking for a stop condition. When the stop condition is met, the iterative process 207 stops and when the stop condition is not met, the iterative process 207 continues.

Method 200 of FIG. 2 and method 600 of FIG. 6 (which includes features of method 200 and vice versa) may be repeated for any appropriate number of latches and gates in an IC design and for any appropriate number of times. When the computer system 100 determines that movement of the latches and gates of method 200 and 600 is complete for the IC design, a physical chip can be fabricated based on the IC design. Fabrication of a physical chip based on the IC design is discussed in further detail below with respect to FIG. 22.

Embodiments of routing for IC design may provide routing solutions that comply with timing requirements.

Rerouting may be performed to improve timing using an existing netlist. A netlist including a number of latches and a route connecting a source to a sink may be received. The route between the source and the sink may be detached by temporarily disconnecting (or hiding connectivity) any logic gates, such as latches, that are located between the source and a given sink (which may be located in one or more levels downstream from the source). Therefore, in some embodiments, the intermediate logic may include paths containing one or more latches. After disconnecting the latches, the net connected to the source may be connected to the given sink and any intermediate latches and driving nets are temporarily removed from the design. A global route may then be created for the net connecting a source to a downstream sink that takes wiring limitations and numbers of lanes available in the IC design into account. After routing, the removed latches and nets are added back to the netlist, using the created route as guidance for latch placement. The latches may then be legally placed on the global route in a manner than reduces congestion and delay in the integrated circuit.

Multiple levels of logic may be identified and hidden from a netlist to enable routing between a source and a sink. The source may be in a first logic level and the sink (or sinks) may be in one or multiple different logic levels downstream. The logic levels to be temporarily hidden are identified (e.g., by saving of latch and/or gate names), such that connectivity is preserved, and are removed from the netlist. The same names may be maintained for the latches during hiding and unhiding, and when placing the latches in the global route, in order to maintain latches as part of the original netlist. A global route is then determined as if the source and sinks are directly connected, without the hidden logic. The global route is defined by the location of the source and the sink. Therefore, the global route may take a best path chosen by the router. For example, the global route may extend through available wiring in a hierarchical block in the IC, in which the latches may not be placed. Once the global route is created the hidden logic is added back to the netlist. The global route may be manipulated such that portions of the route are added to appropriate respective logic level nets in order to accommodate the unhidden intermediate logic. Placement of latches or other removed logic is performed on the original netlist using the global route as guidance. Latches may be moved along the global route to determine an appropriate location for each latch based on timing and delay constraints (e.g., to ensure balanced latches), while keeping the latches in the same order as in the original route from the netlist.

FIG. 7 shows a process flow diagram of a method 700 for net routing for an IC design in accordance with one or more embodiments of the present invention. Method 700 of FIG. 7 may be implemented in conjunction with any appropriate computer system, such as computer system 100 of FIG. 1. Embodiments of method 700 may be implemented in software 111 and may operate on data stored in mass storage 110 and/or system memory 103. In block 701 of method 700, a netlist corresponding to a selected net from an IC design is received. The IC design may include a plurality of nets including the selected net. The net may include endpoints (i.e. a source and one or more sinks), and any appropriate number and type of intermediate components, including but not limited to latches. The source may be in a first logic level of the IC design, and the sink (or sinks) may be in one or multiple different logic levels downstream in the IC design in some embodiments. In block 702, any intermediate latches located between the source and the sink in the selected net are identified and hidden from the netlist. For each hidden latch, a name of the latch and the network connectivity of the latch may be saved in block 702 based on the latch being removed from the netlist.

In block 703, a global route is determined directly between the source and the sink(s) in the IC design using any available wire tracks in the IC design. The global route may take wiring limitations and numbers of lanes available in the IC design into account. The global route may extend through a hierarchical object, like a unit, a macro, or an intellectual property (IP) unit in the IC design. The hierarchical object may include gates that are configured such that additional gates or latches may not be able to be placed inside the hierarchical object. The hierarchical object may be described as a placement blockage in the IC design. For a current level of the hierarchy, the hierarchical object may be a forbidden area where no gate is permitted to be placed.

In block 704, the latches that were hidden from the netlist in block 702 are unhidden and added back to the netlist of the selected net (i.e., the original netlist is restored). The latches are then placed along the global route that was determined in block 703. The latches are reconnected to the netlist in order based on the latch names and connectivity that were saved in block 702. The global route may be divided into a number of segments corresponding to a number of latches in the net, and a segment may be assigned to the net driven by each latch. In block 705, the placement of the latches on the global route is legalized, and slack in the net is balanced. A multi-dimensional optimization algorithm may be used in block 705 to move the latches to legal positions, in order to meet timing constraints and balance slack amongst the latches. The latches may be moved along the global route to legal positions if the global route may be preserved while meeting timing constraints. If the global route may not be preserved, the global route may be modified as needed in block 705 to meet timing constraints and balance slack in the net, and the latches may be moved along Steiner distances to legal positions.

Method 700 of FIG. 7 can be repeated for any appropriate number of nets in an IC design. When it is determined that all nets in the IC design are appropriately routed (for example, according to method 700 of FIG. 7), a physical chip may be fabricated based on the IC design. Fabrication of a physical chip based on the IC design is discussed in further detail below with respect to FIG. 22. The process flow diagram of FIG. 7 is not intended to indicate that the operations of the method 700 are to be executed in any particular order, or that all of the operations of the method 700 are to be included in every case. Additionally, the method 700 can include any suitable number of additional operations.

Figure 8C:
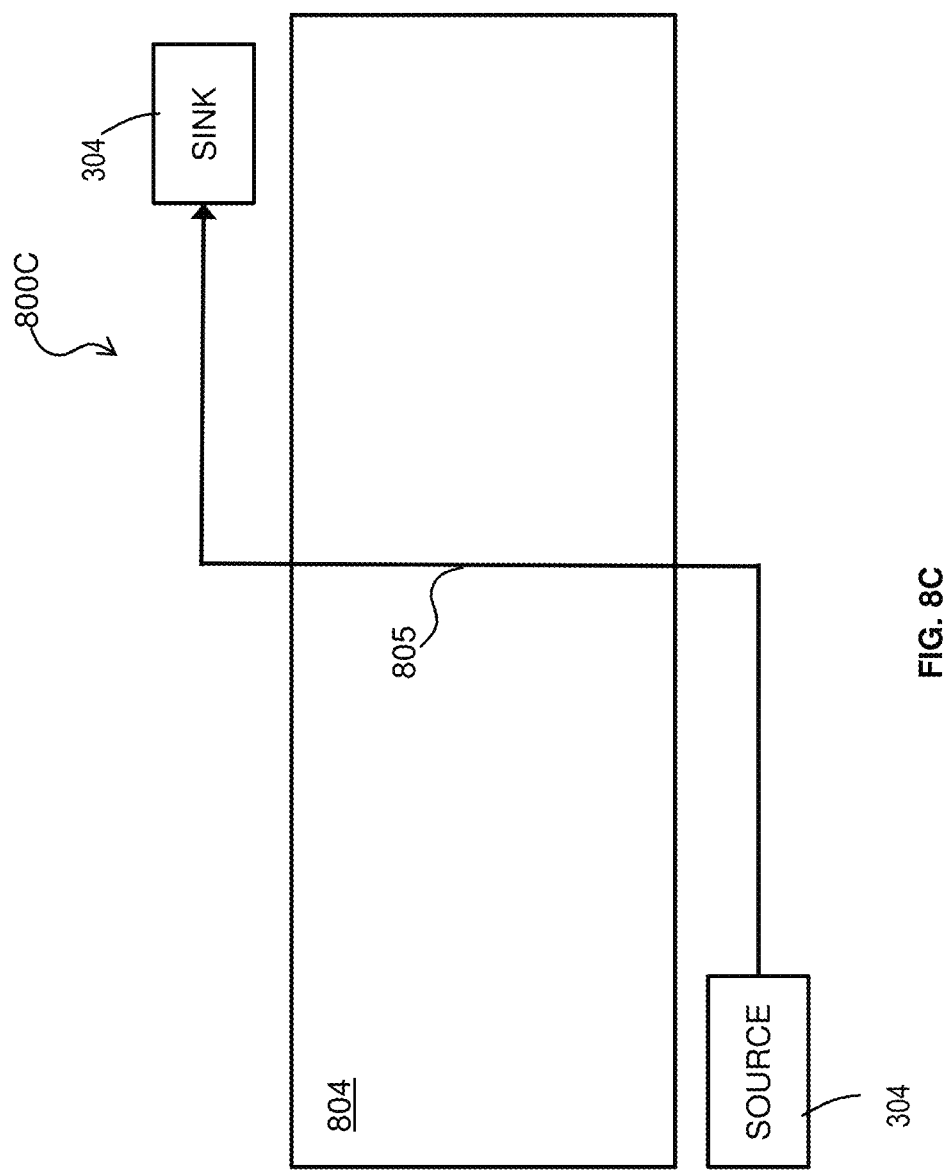
FIG. 8C is a block diagram of components of a system for net routing for an IC design in accordance with one or more embodiments of the present invention.

FIGS. 8A, 8B, 8C, and 8D show block diagrams of components of systems 800A-D for net routing for an IC design in accordance with one or more embodiments of the present invention. FIGS. 8A, 8B, 8C, and 8D are discussed with reference to method 700 of FIG. 7. System 800A of FIG. 8A illustrates an embodiment of a selected net that may be received in block 701 of method 700. The system 800A includes unit 304 (e.g., source), unit 304 (e.g., sink), and intermediate logic comprising latches 302 (e.g., latches 1 and 3). System 800B of FIG. 8B illustrates removal of the intermediate latches 302 (e.g., latches 1 and 3) from the selected net, as is performed in block 702 of FIG. 7. As shown in FIG. 8B, unit 304 (e.g., source such as unit A) and unit 304 (e.g., sink such as unit D) are directly connected. Information regarding the intermediate latches 302 (e.g., latches 1 and 3), including names and connectivity, may be saved based on hiding of the intermediate latches 302.

System 800C of FIG. 8C illustrates an embodiment of creation of a global route 805 that connects unit 304 (e.g., source such as unit A) to the unit 304 (e.g., sink such as unit D) in the IC design without the intermediate latches 302 (e.g., latches 1 and 3), according to block 703 of FIG. 7. As shown in system 800C, the global route 805 includes available wiring that is located over, but outside of, a hierarchical object 804 of the IC design, which may represent but is not limited to a unit, a macro, or an IP unit in the IC design. In some embodiments, the global route 805 may extend through the hierarchical object if the hierarchical object has available wiring tracks that are visible from the outside of the hierarchical object. The hierarchical object 804 may include any appropriate number of gates located inside the object, such that additional gates or latches may not be able to be placed inside the hierarchical object 804.

Figure 8D:
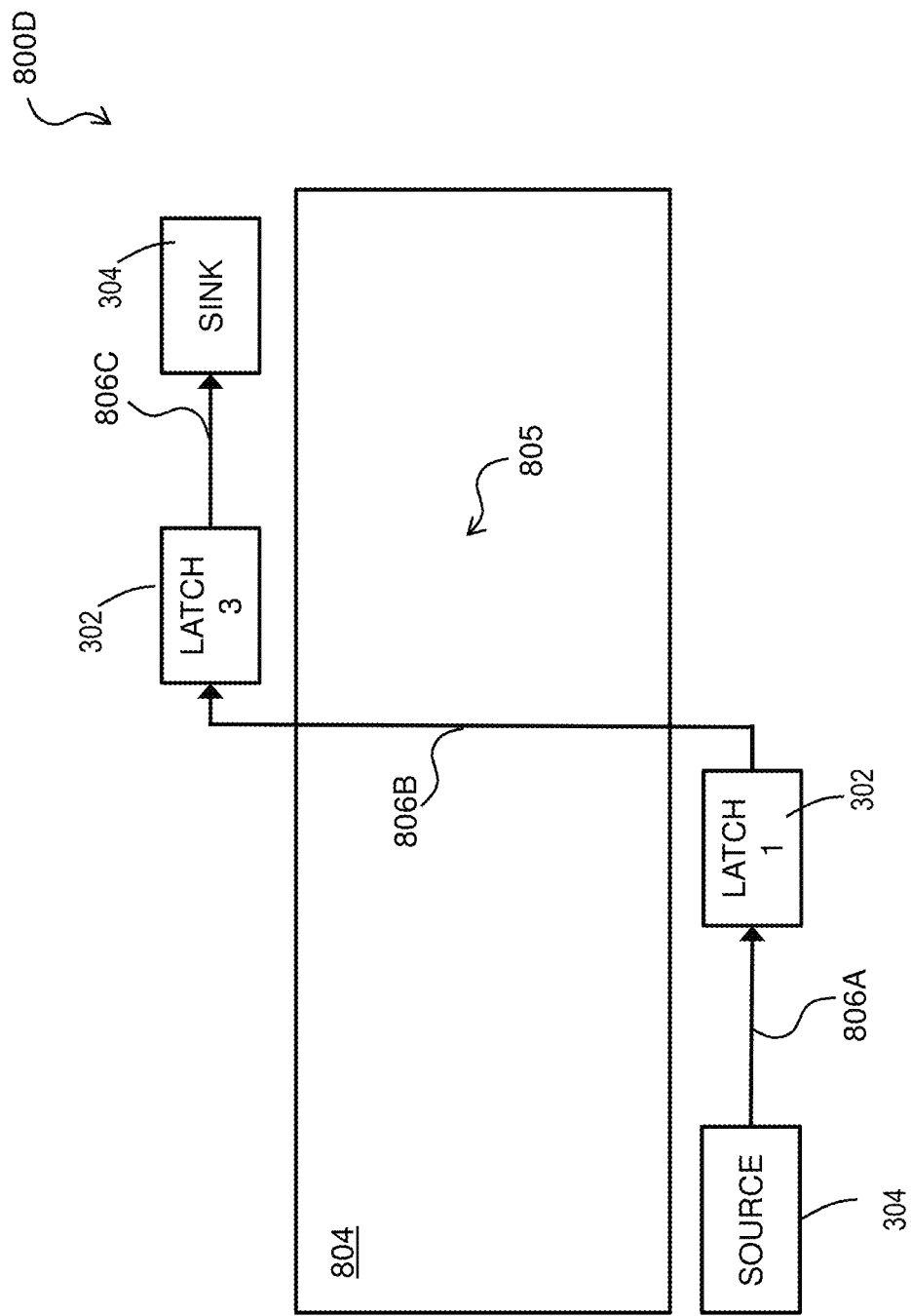
FIG. 8D is a block diagram of components of a system for net routing for an IC design in accordance with one or more embodiments of the present invention.

System 800D of FIG. 8D illustrates an embodiment of latch placement according to blocks 704 and 705 of FIG. 7. The latches 302 (e.g., latches 1 and 3) are added back into the netlist of the selected net and placed along the global route 805, based on global route segments 806A-C, which correspond to, or form, global route 805. The placement of the latches 302 (e.g., latches 1 and 3) on the global route segments 806A-C is legalized, and slack in the net is balanced. A multi-dimensional optimization algorithm may be used to move the latches to legal positions along the global route 805 (by, for example, modifying the lengths of any of global route segments 806A-C), in order to meet timing constraints and balance slack amongst the latches in the net. A longer global route segment between two latches may correspond to higher slack. The latches may be moved along the global route 805 to legal positions if the global route may be preserved while meeting timing constraints. If the global route 805 may not be preserved, the global route may be modified as needed (e.g., by changing the lengths of any of global route segments 806A-C) to meet timing constraints and balance slack in the net, and the latches may be moved along Steiner distances to legal positions.

It is to be understood that the block diagrams of FIGS. 8A, 8B, 8C, and 8D are not intended to indicate that the systems 900A-D are to include all of the components shown in FIGS. 8A, 8B, 8C, and 8D. Rather, the systems 800A-D can include any appropriate fewer or additional components not illustrated in FIGS. 8A, 8B, 8C, and 8D (e.g., nets, sources, sinks, intermediate logic, latches, IC components, global routes, global route segments, gates, units, hierarchical objects, additional memory components, embedded controllers, functional blocks, connections between functional blocks, modules, inputs, outputs, etc.). Further, the embodiments described herein with respect to systems 800A-D may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

While various techniques provide adequate placement of cells with regard to their data interconnections, there is an additional challenge for the designer in constructing a clock network for the cells, which requires a large amount of power. There are several techniques for minimizing power while still achieving timing objectives for high performance, low power systems. One method involves the use of local clock buffers (LCBs) to distribute the clock signals. A typical clock control system has a clock generation circuit (e.g., a phase-lock loop) that generates a master clock signal which is fed to a clock distribution network that renders synchronized global clock signals at the LCBs. Each LCB adjusts the global clock duty cycle and edges to meet the requirements of respective circuit elements, e.g., local logic circuits or latches (the term "latch" as used herein stands for any clocked element which is usually a sink of a clock distribution network). Since this clock network is one of the largest power consumers among all of the interconnects, it is further beneficial to control the capacitive load of the LCBs, each of which is driving a set of many clock sinks. One approach for reducing the capacitive load is latch clustering, i.e., clusters of latches placed near the respective LCB of their clock domain. Latch clustering combined with LCBs can significantly reduce the total clock wire capacitance which in turn reduces overall clock power consumption. Since most of the latches are placed close to an LCB, clock skew is also reduced which helps improve the timing of the circuit.

According to one or more embodiments of the invention, when placing cells in a circuit layout it is generally desirable to attempt to optimize the placement of latches in relation to LCBs. Conventional methods of latch placement involve placing the latches based on timing characteristics and once placed, utilizing a shuddling mechanism that involves cloning and placing LCB's. The LCB receives a signal from a latch (which may be referred to as a "clock gating latch") that turns the clock on or off to save power at the other connected latches (which may be referred to as "data latches"). However, at the time the data latches are initially placed the placement of the LCB is unknown. The ultimate purpose of the clock gating latch is to gate the data latches that are controlled by the LCB, but it does this through the LCB which has not yet been placed. During initial latch placement, the latch that drives the LCB with this signal will need to be placed, but because the position of the LCB is unknown at this point it is not apparent where the clocking gating latch should be placed. This is problematic because the clock gating latch may not be placed near the location of the cloned LCB that controls the data latches, which can result in timing problems.

One or more embodiments of the invention disclose methods and techniques for optimizing placement of clock gating latches that drive cloned LCBs and ultimately control the data latches. Such techniques involve identifying, during the initial latch placement, cases where the LCB has not yet been placed and a latch that drives the LCB needs to be placed and then "looking through" the uncloned LCB to see where the true sinks of the clock gating are and placing the latch based on the location of these sinks (i.e., data latches). The LCB can then later be cloned and moved towards the latches to further optimize the overall relative placements. This is advantageous because it can be achieved without performing multiple passes.

As an optimization, FIG. 9 depicts a portion of a system 900 of an integrated circuit design having a clock gating latch 902, a local clock buffer (LCB) 904, a source latch 905 and data latches 906 in accordance with one or more embodiments of the present invention. The latches 302 can include and/or be representative of one or more clock gating latches 902, source latches 905, and data latches 906 discussed in figures below. The optimization in FIG. 9, along with FIGS. 10A and 10B below, can be implemented in conjunction with any appropriate computer system, such as computer system 100 of FIG. 1. The optimizations of FIGS. 9, 10A, and 10B may be implemented in software 111 and may operate on data stored in mass storage 110 and/or system memory 103. As shown in FIG. 9, the output of the source latch 905 is to an input of the clock gating latch 902, the output of the clock gating latch 902 is connected as an input to the LCB 904, and outputs of the LCB 904 are respectively connected to each of the data latches 906. Although FIG. 9 depicts the clock gating latch 902 as having another latch as an input (i.e., source latch 905), one skilled in the art will understand that in various embodiments the clock gating latch 902 can have different types of circuit elements as inputs. In accordance with this configuration, in addition to receiving an input signal via a net connected to the source latch 905, the clock gating latch 902 can control the LCB 904, which in turn can control the data latches 906. Thus, the true sinks of the clock gating latch 902 are the data latches 906 during this optimization. As indicated by the dotted lines in FIG. 9, clock gating latch 902 can identify its true sinks by "looking through" the LCB 904 to determine where the outputs of the LCB 904 lead. When "looking through" the LCB 904 in this manner, the clock gating latch 902 can be viewed as though it is directly connected to the data latches 906 (i.e., as though the LCB 904 does not exist and is not present in the IC design). The clock gating latch 902 can be operative to selectively turn on and off all of the data latches 906 via the LCB 904 so that power can be conserved by turning off a group of data latches 906 when they are not being used. As described above, the LCB 904 may be a cloned LCB that may not have been positioned at the time of placement of the latches 902 and 906, as the latches are placed/positioned within the system 900 (e.g., layout of the IC design) prior to the LCB 904. However, as shown in FIG. 9, this can result in a placement of the clock gating latch 902 in a position that is inefficient for timing purposes. As will be appreciated by those of skill in the art, a latch placement routine may result in a situation where the clock gating latch 902 is far away from its true sinks (i.e., the data latches 906), which can cause timing problems. Latch placement routines may result in placement of the clock gating latch 902 far from its true sinks because latches are placed based off of the connectivity and timing of the data signal coming in and the data signal going out and at the time of initial placement of the clock gating latch 902, the data signal feeding into the clock gating latch will be connected to logical gates and the data signal out will be connected to an LCB that has not been cloned and optimally placed. Because the LCB that connects to the output of the clock gating latch 902 is either unplaced or sub-optimally placed at the time of placement of the clock gating latch 902, conventionally, the initial placement of the clock gating latch will also not be optimal.

Figure 11:
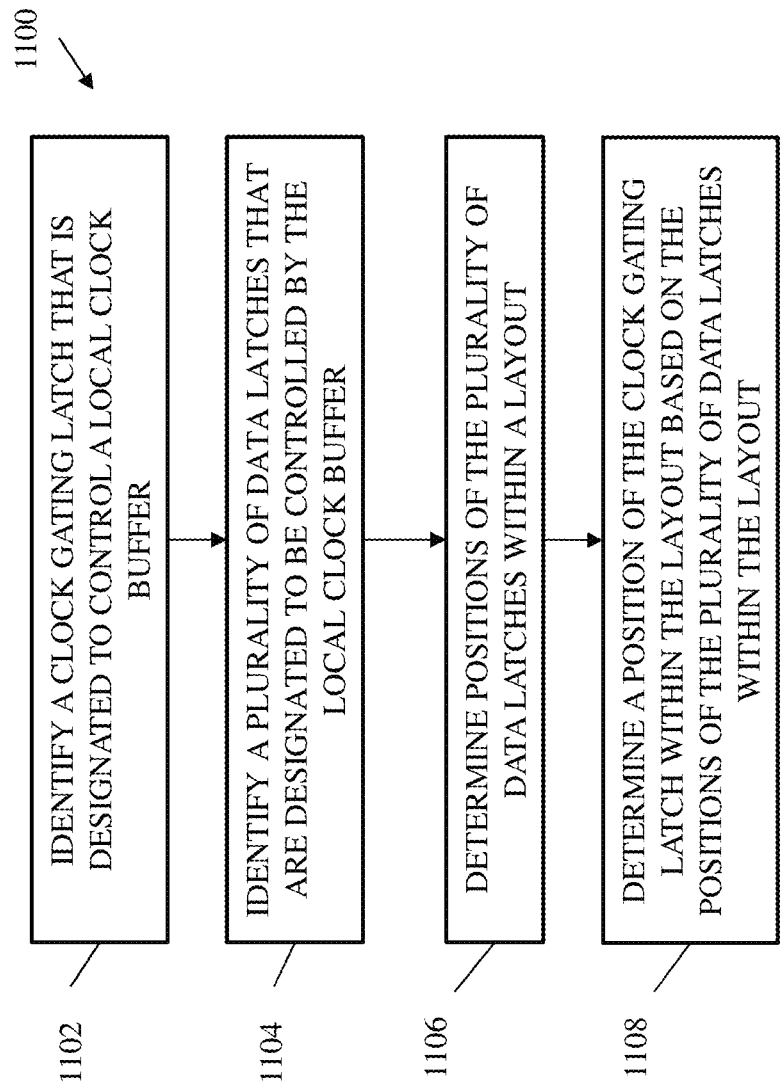
FIG. 11 is a flow diagram of a process for improved placement of a clock gating latch in accordance with one or more embodiments of the present invention.

FIGS. 10A and 10B depict a portion of a system 1000 of an integrated circuit design where the clock gating latch has been placed in accordance with a method 1100 for improved placement of a clock gating latch in accordance with one or more embodiments of the present invention, and as described in greater detail below with respect to FIG. 11. Turning now to FIG. 11, a flow diagram of a method 1100 for improved placement of a clock gating latch is generally shown in accordance with one or more embodiments of the present invention. In one or more embodiments of the present invention, the method 1100 may be embodied in software 111 that is executed by computer system 100. The method 1100 begins at block 1102 and includes identifying (e.g., via computer system 100) a clock gating latch (e.g., latch 902) that is designated to control a local clock buffer (e.g., LCB 904). According to some embodiments, identifying the clock gating latch can include identifying a latch that has an output pin that is designated to connect to a specified input pin of the local clock buffer based on the connectivity of the netlist at the time of placement. As will be understood by those of skill in the art, a netlist may be a list of circuit elements that specifies which elements should be connected together and which pins the connections should occur at. An LCB may be configured to use a specified pin as to receive an input from a clock gating latch, and thus the latch that is designated to connect to this input pin of the LCB may be considered to be a clock gating latch. A netlist is a record of all of the nets, or interconnections, between the cell pins. In other words, for a given LCB provided in the netlist, the computer system 100 may look up the pin connections of the LCB and determine that a particular latch is connected to a particular input pin of the LCB and may designate this latch as being the clock gating latch. As described previously above, the clock gating latch can be configured to control a power supply to the plurality of data latches (e.g., data latches 906) via the LCB. As will be understood by those of skill in the art, during operation the clock gating latch can power down the plurality of data latches when they are not being used to preserve power.

As shown at block 1104, the method 1100 includes identifying (e.g., via computer 100) a plurality of data latches that are designated to be controlled by the local clock buffer. These data latches can be identified in a similar manner to the identification of the clock gating latch by referencing the netlist. In other words, according to some embodiments, identifying a plurality of data latches that are designated to be controlled by the local clock buffer can include identifying a plurality of latches that have input pins that are designated to connect to output pins of the local clock buffer based on the netlist. In this way, the system can "see through" the LCB to determine what the sinks of the clock gating latch are.

Figure 12C:
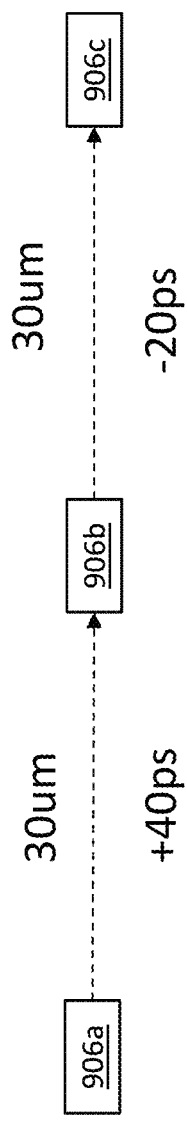
FIG. 12C depicts an example of signal timing between three latches in accordance with one or more embodiments of the present invention.
Figure 12D:
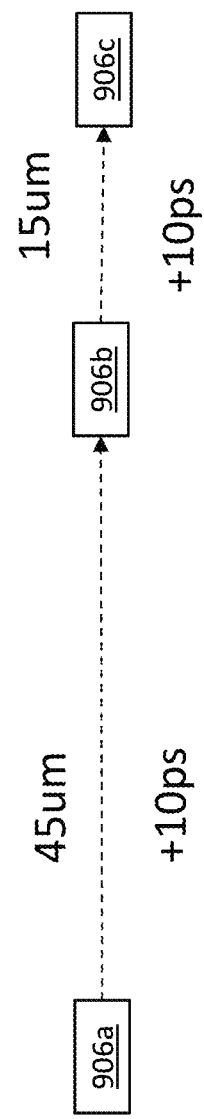
FIG. 12D depicts an example adjustment of the relative positioning of three latches to optimize signal timing in accordance with one or more embodiments of the present invention.

As shown at block 1106, the method 1100 includes determining (e.g., via computer system 100) positions of the plurality of data latches within a layout. In some embodiments of the invention, determining positions of the plurality of data latches within a layout can be achieved using various techniques, such as positioning data latches based on minimizing wire length on the data input and output nets while maintaining timing requirements. FIG. 12A shows an initial placement of a first data latch 906a, a second data latch 906b and a third data latch 906c relative to one another, with the second data latch 906b having nets of 40 um between both the first data latch 906a and the third data latch 906c. FIG. 12B shows that the net length can be minimized by repositioning the second data latch 906b such that the nets between the second data latch 906b and each of the first data latch 906a and the third data latch 906c are reduced to 30 um each. FIG. 12C shows that the timing between the first data latch 906a and the second data latch 906b is +40 ps and the timing between the second data latch 906b and the third data latch 906c is −20 ps, based on the repositioning of the second data latch 906b that occurred in FIG. 12B. FIG. 12D shows that the second data latch 906b can be adjusted again to now optimize timing (without changing the overall net length) by being moved to a position that results in timing of +10 ps between each of the legs of the circuit. As will be understood by those of skill in the art, this is generally an iterative process in which each latch can be analyzed and placed in a serial fashion. The process may generally be repeated multiple times to anneal to the optimal solution for the placement of the data latches 906.

As shown at block 1108, the method 1100 includes determining (e.g., via computer system 100) a position of the clock gating latch (e.g., latch 902) within the IC design based on the positions of the plurality of data latches (e.g., latches 906) within the IC design. In some embodiments, determining a position of the clock gating latch based on the positions of the plurality of data latches within the IC design can include determining a centroid position of the plurality of data latches within the IC design and designating the centroid position as the position of the clock gating latch. In some embodiments, determining the position of the clock gating latch based on the positions of the plurality of data latches within the layout can include placing the clock gating latch based on a process, similar to that illustrated previously with respect to FIGS. 12A through 12D (along with other latch placement optimizations discussed herein), that treats the data latches as sinks of the clock gating latch (i.e., ignores the intermediate LCB) and minimizes the theoretical net length between the clock gating latch and its connected source and sinks (e.g., in a manner similar to that shown in FIGS. 12A and 12B) and can optimize the timing between them (e.g., in a manner similar to that shown in FIGS. 12C and 12D). Although the clock gating latch is not directly connected to the data latches, it may be treated as such for the purpose of determining the location of the clock gating latch based on the positions of the data latches and the source. Thus, in some embodiments, determining a position of the clock gating latch based on the positions of the plurality of data latches within the layout can include determining a source position of a source of the clock gating latch (e.g., a source latch) within the layout, determining a net-minimizing position within the layout that has a minimum collective distance to each of the source position and the positions of the plurality of data latches (e.g., in a manner similar to that shown in FIGS. 10A and 10B) and designating the net-minimizing position as the position of the clock gating latch. Accordingly, in some embodiments, the clock gating latch can be positioned at a location that is designed to minimize the total distance between the clock gating latch and (1) the source (e.g., source latch 905 shown in FIGS. 10A and 10B) and (2) each of the data latches that are sinks of the clock gating latch (e.g., data latches 906 shown in FIGS. 10A and 10B). In some embodiments, the position of the clock gating latch may be further adjusted to optimize the timing characteristics of the circuit following the final placement of the LCB or cloned LCB (e.g., as shown in FIG. 10B) in a manner similar to that shown in FIGS. 12C and 12D.

FIG. 10A shows an example placement of the clock gating latch 902 that could be used in accordance with method 1100, along with other latch placement optimizations discussed herein. As shown in FIG. 10A, the clock gating latch 902 can be placed at a location that is proximate (or closer to) the group of data latches 906 that are the sinks of the clock gating latch (i.e., that are to be connected to the cloned LCB 904 that is controlled by the clock gating latch 902) following the determination of the position of the clock gating latch 902 as described above. As will be appreciated by those of skill in the art, the LCB 904 will initially be placed after the placement of the latches 902, 905, 906 and then can be moved to a location that is more central to the data latches 906 to which the LCB 904 is connected to via output nets. In some embodiments, the data latches 906 can be shuffled (or positioned) around the LCB 904 to further reduce the length of the nets (i.e., wiring) between them. For example, FIG. 10B shows an example of a repositioning of the LCB 904 to a location proximate to the data latches 906 (e.g., to a central or an approximately centroid position of the data latches 906) along with a shuffling of the data latches 906 around the LCB 904 (i.e., adjusting the positions of the data latches 906 so they are very near to the LCB 904).

The example shown in FIG. 10B depicts the final positioning of the latches 902, 905, 906 and LCB 904 in accordance with the method 1100. As shown, following the method 1100 can result in the overall length of the nets (i.e., the connections between the various latches and the LCB) being minimized and the timing characteristics of the system 1100 being improved or optimized (over system 900) (e.g., by repositioning one or more elements up or down their route (i.e., to a new position along the path of the connected net) based on timing measurements in a manner similar to that shown in FIGS. 12C and 12D).

In some embodiments, the method 1100 can further include positioning the local clock buffer based on the positions of the plurality of data latches within the IC design. For example, as explained above, the LCB may be moved to an approximately central or centroid location relative to the data latches to attempt to minimize the length of the nets and improve circuit timing. In some embodiments, the system may position the LCB to minimize a total net length between the local clock buffer and each of the plurality of data latches without regard to the position of the clock gating latch. According to some embodiments, after cloning (i.e., after creation of this particular instance of the LCB), the LCB can be positioned at a central location among the data latches it controls and then those latches are clustered around the LCB, as described above with respect to FIG. 10B.

According to some embodiments, the method 1100 can further include determining that a total number of the plurality of data latches exceeds a threshold number and cloning the LCB to create at least one cloned LCB. As will be appreciated by those of skill in the art, a LCB may be physically limited in the number of latches it can control. Thus, if a netlist indicates that an LCB is connected via output pins to 100 data latches, but the maximum number of latches that can be controlled a given LCB is 20, then it may be necessary to clone the LCB a number of times (i.e., to generate at least 5 instances of the LCB in this case) to accommodate the number of latches that are designated to be controlled by it. In some embodiments, the method may further include positioning the LCB based on the positions of a first subset of the plurality of data latches within the layout and positioning the cloned LCB based on the positions of a second subset of the plurality of data latches within the layout. The first subset of the plurality of data latches can be controlled by (i.e., connected as outputs to) the LCB and the second subset of the plurality of data latches can be controlled by the cloned LCB. In other words, if the netlist indicates that a given LCB is designated to control more than the maximum amount of data latches that a single LCB can handle, then the system may clone the LCB and identify a plurality of groups of data latches that are each controlled by a cloned LCB. Each cloned LCB may then be independently positioned within the layout based on the locations of the data latches that are in the corresponding group of latches (i.e., the group of latches that are connected as outputs to each respective cloned LCB).

According to some embodiments, a clock gating latch may be designated to control more than one LCB (e.g., as indicated by the netlist). Each LCB may control its own respective set of data latches. In such a case, according to some embodiments, the position of the clock gating latch can be determined based on the positions of all of the data latches of the respective set of latches. For example, in some embodiments, the clock gating latch may be positioned at the centroid location of all of the latches of the combined respective sets of latches, but the corresponding cloned LCB's may be positioned based on a single respective set of data latches. In some embodiments, the clock gating latch may be positioned based on minimizing the overall net lengths between the clock gating latch and (1) a input element (such as source latch 905 in FIG. 5A) and (2) all of the latches of the combined respective sets of data latches (when "seeing through" the LCBs to view the data latches as the true sinks of the clock gating latch) and if necessary, adjusting the position of the clock gating latch to optimize timing between the clock gating latch and the data latches (i.e., in a process similar to that shown in FIGS. 12A through 12D) and then positioning the corresponding cloned LCB's based on a single respective set of data latches (i.e., positioning each LCB/cloned LCB relative to its connected data latches in a process similar to that shown in FIG. 10B). According to some embodiments, the position of the clock gating latch does not affect the placement of any LCB (or cloned LCB).

Figure 13:
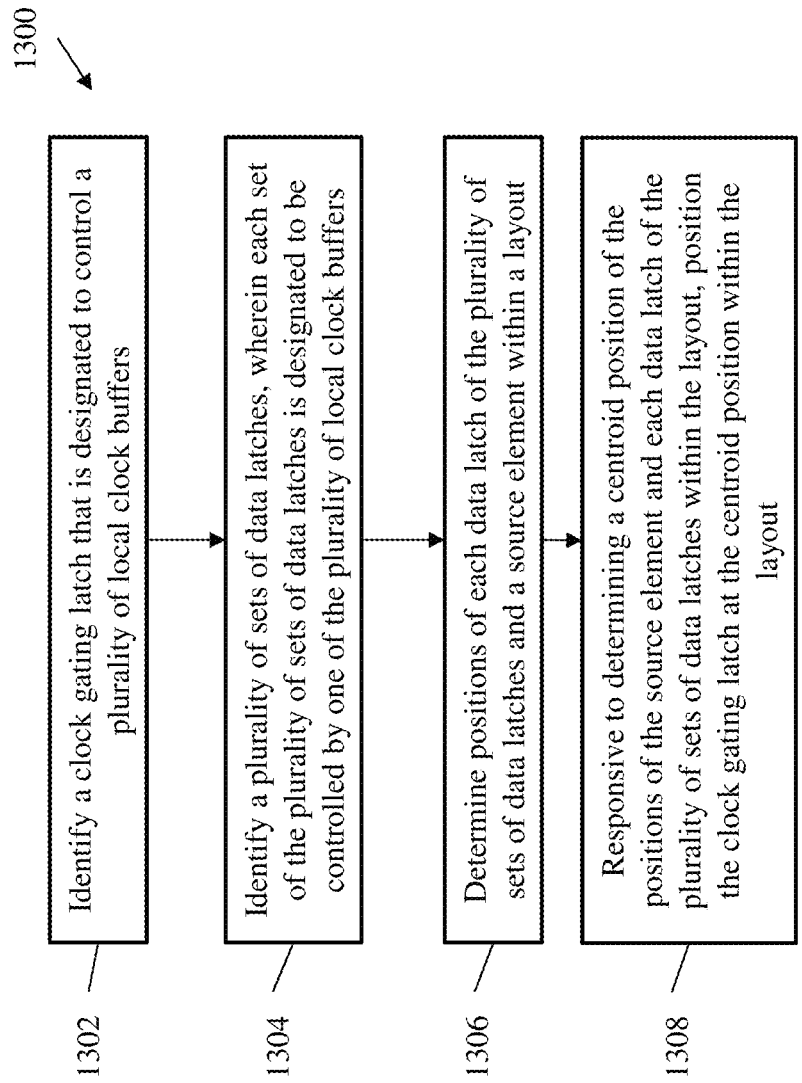
FIG. 13 illustrates a flow diagram of another process for improved placement of a clock gating latch in accordance with one or more embodiments of the present invention.

Turning now to FIG. 13, a flow diagram of another method 1300 for improved placement of a clock gating latch in accordance with an embodiment is shown in accordance with one or more embodiments of the present invention. In one or more embodiments of the present invention, the method 1300 may be embodied in software 111 that is executed on computer 100.

The method 1300 begins at block 1302 and includes identifying (e.g., via computer system 100) a clock gating latch that is designed to control a plurality of local clock buffers. The clock gating latch can be identified, for example, by examining the pin connections between the LCB's and the clock gating latch as recorded in a stored netlist. Further, a source element that provides an input signal to the clock gating latch can also be identified by examining pin connections between the clock gating latch and the source element.

As shown at block 1304, the method 1300 includes identifying (e.g., via computer system 100) a plurality of sets of data latches (e.g., based on a netlist), wherein each set of the plurality of sets of data latches is designated to be controlled by one of the plurality of local clock buffers. For example, each set of data latches can be identified by identifying which data latches are connected as outputs to a given LCB (e.g., via viewing pin connections in a stored netlist on computer 100).

As shown at block 1306, the method 1300 includes determining (e.g., via computer 300) positions of each data latch of the plurality of sets of data latches and the source element within a layout (e.g., a circuit layout or a semiconductor layout). According to some embodiments, the positions can be two-dimensional coordinates within a circuit layout of the IC design.

As shown at block 1308, the method 1300 includes responsive to determining a centroid position of the positions of the source element along with each data latch of the plurality of sets of data latches and the within the layout, positioning (e.g., via computer 100) the clock gating latch at the centroid position within the IC design. Additionally and/or alternatively, the clock gating latch can be positioned at a location that minimizes the collective overall net length between the clock gating latch and (1) the source element and (2) each data latch of the plurality of sets of data latches, and optionally optimizes timing between the connections (e.g., in a manner similar to that described above with respect to FIGS. 12A-12D).

The method can also include positioning each of the local clock buffers (or cloned LCBs) at a location that is central to the corresponding set of data latches of the plurality of sets of data latches (i.e., to the set of data latches that are designated as being connected as outputs to the LCB). In this way, even though the clock gating latch controls multiple different LCB's, it can be positioned centrally to all of the data latches that are the true sinks of the clock gating latch, and each of the LCB's can be moved to a position that is near its respective group of data latches that it controls to improve overall timing characteristics of the circuit. Each of the plurality of sets of data latches can be shuffled around its respective LCB to further reduce net length and improve timing characteristics.

LCBs and their connected latches are typically controlled upstream by local clock buffer control circuitry (each instance of which may be referred to as a "local clock buffer controller"). As will be appreciated by those of skill in the art, a local clock buffer controller can be a sub-circuit that is configured to control up to a maximum number of latches via one or more LCBs. A local clock buffer controller may theoretically control an unlimited number of LCBs, however it may ultimately control only up to a maximum number of latches connected to the LCBs (e.g., 200 latches), therefore, a given circuit design may include a large number of local clock buffer controllers to control all of the latches in the circuit design. Although various instances of local clock buffer controllers may be standardized sub-circuits (i.e., identical or approximately identical), there can be different types of local clock buffer controllers that each have a different design. For example, the type of the local clock buffer controller can be based on the domain (e.g., functional clock domain vs. test clock domain) of the local clock buffer controller. Historically, latches were placed in a manner in which they were pre-clumped together around their own set of local clock buffer controls. However, more modern latch placement methods involve placing the latches at the top level of the design such that they are now free floating and the latches that are controlled by a given local clock buffer controller are conventionally assigned by a method that is not physically aware, which can result in an undesirable excess of wiring required to connect the local clock buffer controllers to the LCBs. Such excess wiring can increase the complexity of a circuit design and generate timing issues that can negatively impact circuit performance.

One or more embodiments of the invention disclose methods and techniques for providing improved placement of local clock buffer controllers within a circuit design to reduce the overall amount of wiring needed. Embodiments of the invention can utilize an algorithm, such as a k-means clustering algorithm or nearest neighbor algorithm, to distribute the placement of local clock buffer controllers within a circuit design in a more decentralized fashion and then reconnect the latches to the nearest local clock buffer controller. According to some embodiments, the algorithm may determine the centroid positions of a plurality of clusters of latches and place a local clock buffer controller at each of the determined centroid positions prior to reconnecting the latches. The centroid positions can be determined by an iterative process of reclustering the latches and adjusting the positions of centroids based on the new clusters until the clusters and centroid positions are fixed. The local clock buffer controllers can be placed at the determined centroid positions and can be reconnected to the latches (e.g., via LCBs) of the cluster of latches associated with the centroid position as determined by the iterative reclustering process. In this way, the techniques disclosed herein can provide for the improved placement of local clock buffer controls within a circuit design in a manner that allows for a significant reduction in overall net (i.e., wiring) length of the design.

Figure 14:
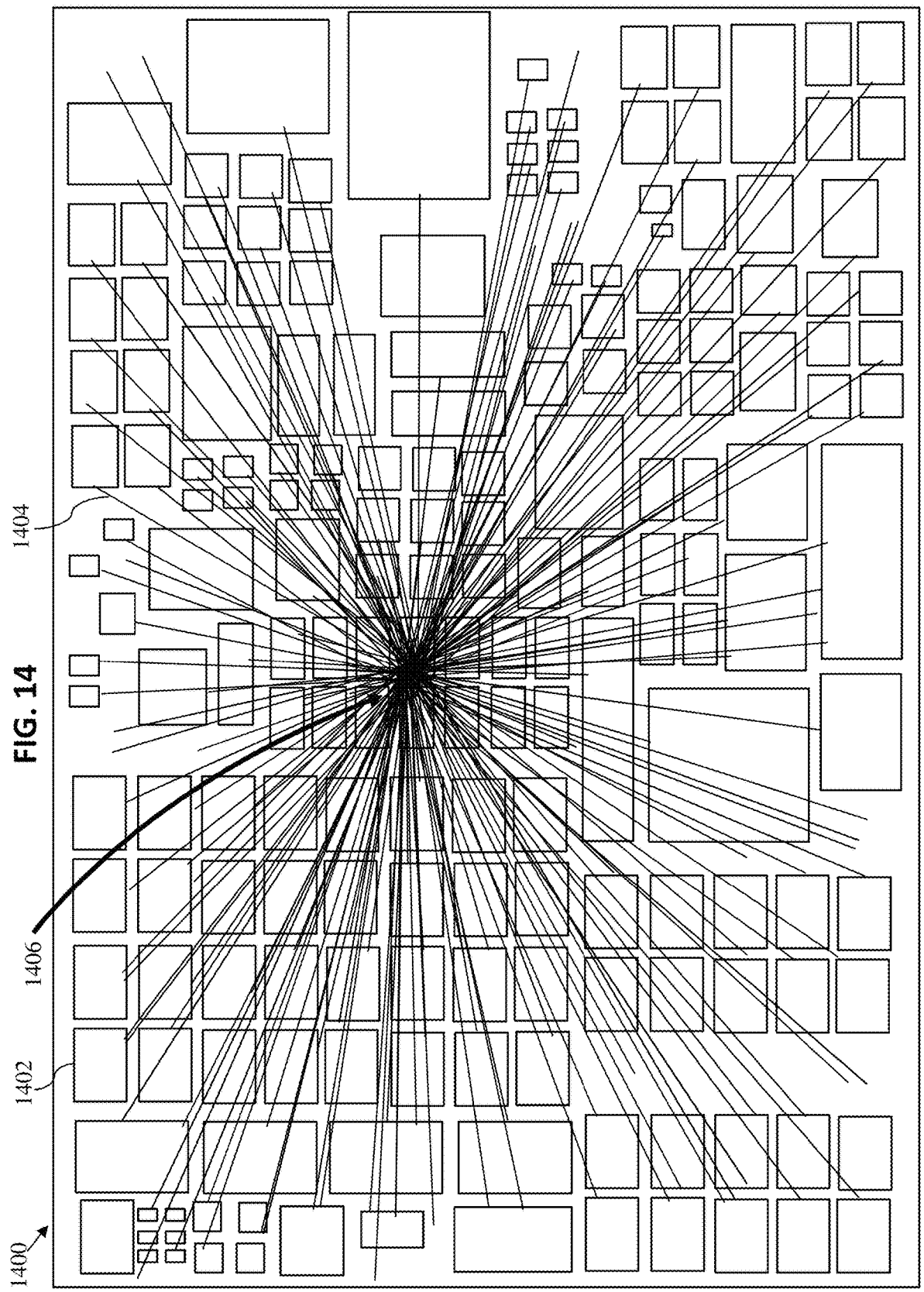
FIG. 14 depicts an example circuit design having centrally located local clock buffer controllers.

FIG. 14 depicts a top view of a system 1400 as an example integrated circuit (IC) design (which may also be referred to as an IC circuit diagram, circuit design, etc.) of an integrated circuit having various circuit elements 1402 (represented by the various boxes). As will be understood by those of skill in the art, each circuit element 1402 can be a modular sub-circuit of the circuit design. Although not depicted due to their relatively small size, it should be understood that a typical circuit design may include thousand or even millions of latches that are each to be connected to one of a plurality of a local clock buffer controllers. Such connections are represented by the plurality of nets 1404 shown in FIG. 14. According to some embodiments, each net 1404 can represent a connection between a latch and a local clock buffer controller. It will be understood that the example system 1400 shown in FIG. 14 is for illustrative purposes and may only include a limited number of latches/nets, whereas in practice a circuit design may include many more latches/nets. In the example shown in FIG. 14, a plurality of local clock buffer controllers 1406 are positioned at the center of the system 1400 (e.g., circuit diagram), which can cause the overall net length to be high due to the distribution of latches throughout the entire area of the circuit design. The high overall net length of a circuit design such as that shown in FIG. 14 can be improved upon using the techniques disclosed herein.

Figure 15:
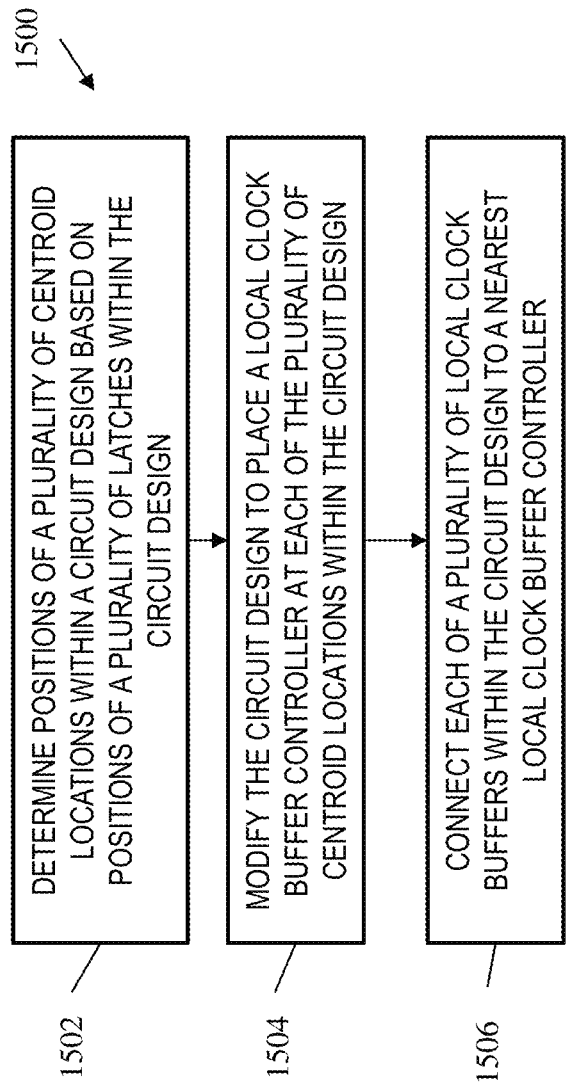
FIG. 15 is a flow diagram of a process for providing improved placement of local clock buffer controllers in accordance with one or more embodiments of the present invention.

Turning now to FIG. 15, a flow diagram of a method 1500 for providing improved placement of local clock buffer controllers in accordance with an embodiment is shown. In one or more embodiments of the present invention, the method 1500 may be embodied in software 111 that is executed by processors 101 of computer 100 illustrated in FIG. 1.

The method 1500 begins at block 1502 and includes determining (e.g., via computer 100) positions of a plurality of centroid locations within a circuit design based on positions of a plurality of latches within a circuit design. A centroid location can refer to the position of a centroid of a group of latches within a two-dimensional plane (e.g., such as the two-dimensional plane of example circuit diagram as shown in FIG. 14) of system 1400. According to some embodiments, the plurality of centroid locations can be a number of centroid locations that is determined by dividing a total number of latches of the plurality of latches by a maximum latch capacity of a local clock buffer controller. For example, if the maximum latch capacity of a local clock buffer controller is 200 and there are 1,000 latches, then the number of centroids will be 5 and the method 1500 will involve determining the positions of 5 centroid locations. According to some embodiments, a local clock buffer controller can be a standardized sub-circuit (e.g., standardized based on the type of local clock buffer controller) that is configured to connect to (e.g., via LCBs) and control a plurality of local clock buffers.

According to some embodiments, the positions of the plurality of centroid locations within the circuit design can be determined using a k-means clustering algorithm as illustrated by the examples shown in FIGS. 16A-D. In some embodiments, using a k-means clustering algorithm can include placing each of the plurality of centroid locations at a respective initial position, determining initial latch clusters based on the respective initial positions of the plurality of centroid locations and the positions of the plurality of latches within the circuit design, and for the plurality of centroid locations, determining respective final latch clusters and respective final positions of the centroid locations by an iterative process. In some embodiments, the initial positions of each of the plurality of centroid locations can be a random position within the circuit diagram. Each initial latch cluster can be a unique subset of the plurality of latches that are associated with a unique one of the plurality of centroid locations. In other words, all of the latches included in the circuit diagram can be grouped into clusters such that each individual latch is only in one cluster. According to some embodiments, the number of clusters can correspond to the number of centroid locations such that each cluster is associated with a particular centroid location of the plurality of centroid locations. In some embodiments, determining initial latch clusters (i.e., identifying which latches are members of which clusters) can include determining a nearest initial centroid location for each latch of the plurality of latches and grouping the plurality of latches into a plurality of initial latch clusters. Each of the plurality of initial latch clusters can be a subset of latches of the plurality of latches that have a same nearest initial centroid location.

Figure 16A:
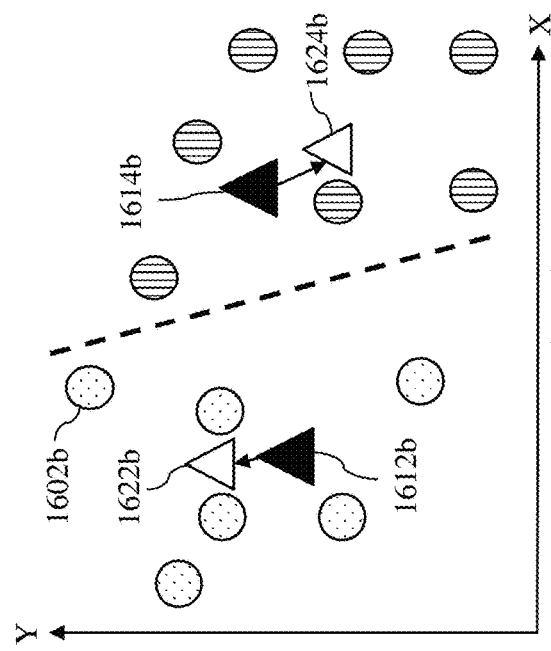
FIG. 16A depicts a first stage of determining centroid locations of latches using k-means clustering in accordance with one or more embodiments of the present invention.

The determination of initial latch clusters can be illustratively shown by FIG. 16A, which depicts a two-dimensional space (X-Y plane) that can be representative of an area within a circuit design that includes a plurality of latches (represented by circles). The plurality of latches shown have been clustered into a first cluster of latches 1602 associated with a first centroid 1612a and a second cluster of latches 1604 associated with a second centroid 1614a. Any of the latches 302 (discussed above) can be representative of the types of latches in the first cluster of latches 1602 and second cluster of latches 1604. According to some embodiments, the centroids 1612a, 1614a may be initially placed at random locations within the circuit diagram. A k-means clustering algorithm may determine which latches belong to each initial cluster by determining which centroid 1612a, 1614a is closest to each latch and assigning each latch to a cluster based on the closest centroid. Thus, the software 111 can determine that each of a first set of latches 1602 (represented as having a polka dot design) is closest to the first centroid 1612a and that each of a second set of latches 1604 (represented as having a striped design) is closest to the second centroid 1614a and can thus form a first cluster of latches 1602 associated with the first centroid 1612a and a second cluster of latches 1604 associated with the second centroid 1614a.

Figure 16B:
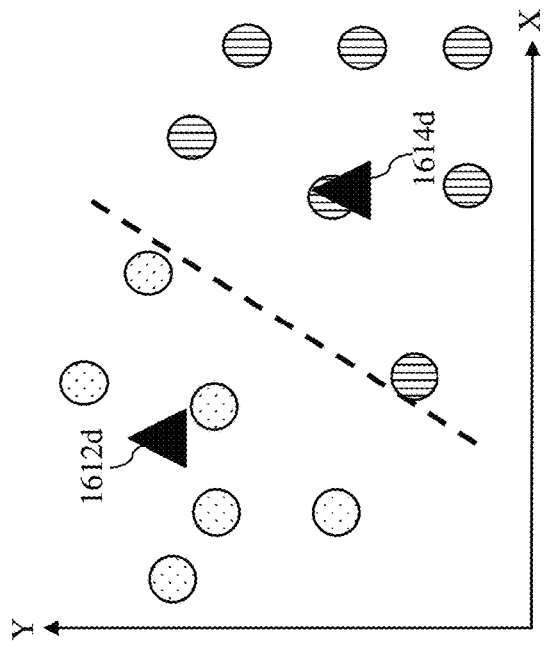
FIG. 16B depicts a second stage of determining centroid locations of latches using k-means clustering in accordance with one or more embodiments of the present invention.
Figure 16C:
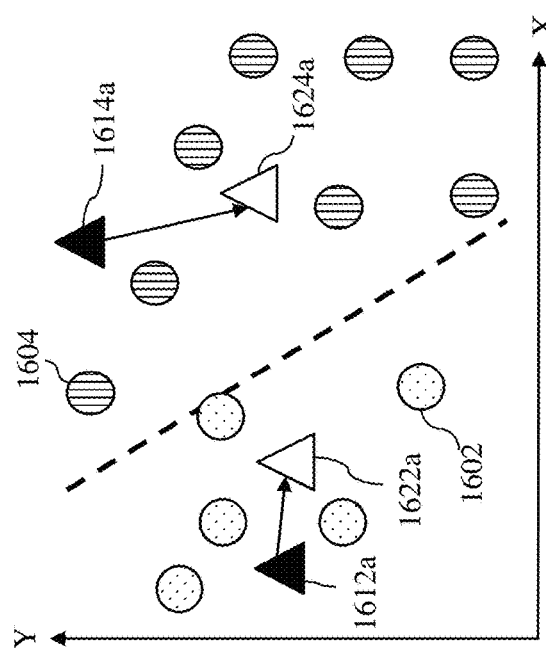
FIG. 16C depicts a third stage of determining centroid locations of latches using k-means clustering in accordance with one or more embodiments of the present invention.

According to some embodiments, the iterative process used to determine final latch clusters and respective final positions of the centroid locations can include adjusting positions of the centroid locations based on positions of latches of associated latch clusters and determining new latch clusters based on the adjusted positions of the centroid locations and the positions of the plurality of latches within the circuit design. Each new latch cluster can be a unique subset of the plurality of latches that are associated with a unique one of the plurality of centroid locations. For example, if there are initially 5 clusters of 200 latches each, upon being reclustered there will still be 5 clusters of 200 latches each, but the individual latches that make up the group of 200 latches of a given cluster may be different than the initial individual latches that made up the 200 latches. In other words, as reclustering occurs, latches may shift from one cluster to another and consequently a given latch may change from being associated with one centroid location to being associated with a different centroid location. As shown in FIGS. 16A, 16B, and 16C, in some embodiments, adjusting positions of the centroid locations based on positions of latches of associated latch clusters can include, for each centroid location: determining a new position that corresponds to the mean of the positions of the latches of the associated latch cluster and moving the position of the centroid location to the new position. For example, as shown in FIG. 16A, a new centroid location 1622a of the first centroid 1612a can be determined by determining the mean position of all of the latches 1602 in the first cluster and likewise a new centroid location 1624a of the second centroid 1614a can be determined by determining the mean position of all of the latches 1604 in the second cluster. According to some embodiments, the mean position of a cluster of latches can be determined by calculating an average of all of the X coordinates of the latches in the cluster to determine a mean X value and the average of all of the Y coordinates of the latches in the cluster to determine a mean Y value. The calculated mean X value and the mean Y value will be the coordinates of the mean position of the cluster of latches. The software 111 can move the first and second centroids 1612a, 1614a to the respective new centroid locations 1622a, 1624a and then perform a reclustering. For example, as shown in FIG. 16B, the first centroid 1612b and the second centroid 1614b having been placed at the respective new centroid locations 1622a, 1624a determined in FIG. 16A, the software 111 can now determine what the closest centroid is for each latch and form new clusters accordingly. Thus, as shown in FIG. 16B, a first latch 1602b (now changed to a polka dot pattern) that was previously in the second cluster (i.e., with a striped pattern as shown in FIG. 3A) is now closest to the first centroid 1612b and is thus now placed in the first cluster. The process repeats and based on the new clusters, a new set of new centroid locations 1622b, 1624b are determined for each cluster by determining the mean position of the latches within each respective cluster. FIG. 16C shows the next stage or iteration of this process, where it can be seen that based on the new locations of the first centroid 1612c and the second centroid 1614c, a second latch 1602c has been removed from the second cluster and has been added to the first cluster, and a third latch 1604c has been removed from the first cluster and added to the second cluster. Based on these new clusters, a new set of new centroid locations 1622c, 1624c for the first and second centroids 1612c, 1614c can be determined by again determining the mean position of all of the latches 1602 in the first cluster and the mean position of all of the latches 1604 in the second cluster respectively.

Figure 16D:
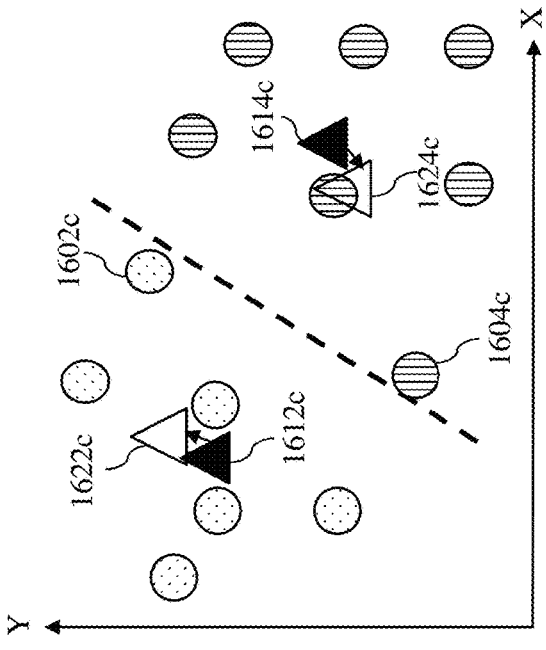
FIG. 16D depicts a fourth stage of determining centroid locations of latches using k-means clustering in accordance with one or more embodiments of the present invention.

According to some embodiments, the respective final positions of the centroid locations can be determined in response to determining that, for each of the centroid locations, the new position is identical to an immediately preceding position of the centroid location. For example, as shown in FIG. 16C, the first centroid 1612c can be moved to a new centroid location 1622c and the second centroid 1614c can be moved to a new centroid location 1624c prior to the next iteration of reclustering. However, as shown in FIG. 16D, when the system attempts to recluster the latches again, the clusters are stable (i.e., no latch switches from one cluster to another) because each latch is now in a cluster that is associated with the closest centroid location. As there is no change in the members of each cluster, the positions of the first and second centroids 1612d, 1614d will not change and thus the first and second centroids 1612d, 1614d can be considered to have found their final locations as a result of the iterative process described above.

Although the example of the k-means clustering algorithm shown in FIGS. 16A-16D only depicts two centroid locations and two clusters, it will be understood that this algorithm may be applied to any number of centroid locations and corresponding clusters. Further, although use of a k-means clustering algorithm to determine the final positions of the centroid locations is described herein, it should also be understood that in various embodiments other algorithms for determining the positions of the centroid locations and/or local clock buffer controllers may be used.

Turning back to FIG. 15, as shown at block 1504, the method 1500 includes modifying (e.g., via computer 100) the circuit design to place a local clock buffer controller at each of the plurality of centroid locations within the circuit design. For example, the circuit design may be embodied in a digital file and placing the local clock buffer controllers at the centroid locations can include modifying the digital file to reflect the inclusion of the local clock buffer controllers at those locations within the circuit design.

According to some embodiments, modifying the circuit design to place a local clock buffer controller at each of the plurality of centroid locations within the circuit design can include, for each of the plurality of centroid locations within the circuit design: modifying the circuit design to place a local clock buffer controller in an area of the circuit design that corresponds to the centroid location in response to determining that the area of the circuit design is empty and/or modifying the circuit design to place a local clock buffer controller in an empty area that is adjacent to the area of the circuit design in response to determining that the area of the circuit design that corresponds to the centroid location is occupied by another circuit element. In other words, if the area within the circuit design that is covered by a given centroid location does not already include some circuit element that occupies the space, then a local clock buffer controller can be placed there, but if the space is already occupied by another circuit element, then the system may place the local clock buffer controller in an empty area that is the closest to the centroid location.

As shown at block 1506, the method 1500 includes connecting (e.g., via computer 100) each of a plurality of local clock buffers within the circuit design to a nearest local clock buffer controller. In some embodiments, the plurality of local clock buffers that are connected to a given local clock buffer controller are the local clock buffers that connect to the plurality of latches that make up the cluster of latches that is associated with the given local clock buffer controller. In other words, each cluster of latches can be connected to a respective local clock buffer controller via one or more local clock buffers.

According to some embodiments, various of the local clock buffer controllers, local clock buffers and latches may be associated with different domains. For example, some local clock buffer controllers and latches may be in the functional clock domain and others may be in the test clock domain. Thus, in some embodiments, connecting each of a plurality of local clock buffers within the circuit design to a nearest local clock buffer controller can include, for each local clock buffer: identifying a domain associated with the local clock buffer and connecting the local clock buffer to a closest local clock buffer controller that is associated with the same domain as the local clock buffer. According to some embodiments, latches that are in different domains can be separately clustered in relation to separate centroid locations from others. In other words, in some embodiments, where there are different sets of latches in different domains, the method 1500 may be applied to each set of latches independently and in parallel such that the locations of a first type of latch do not affect the centroid locations associated with a second type of latch and vice versa.

Figure 17:
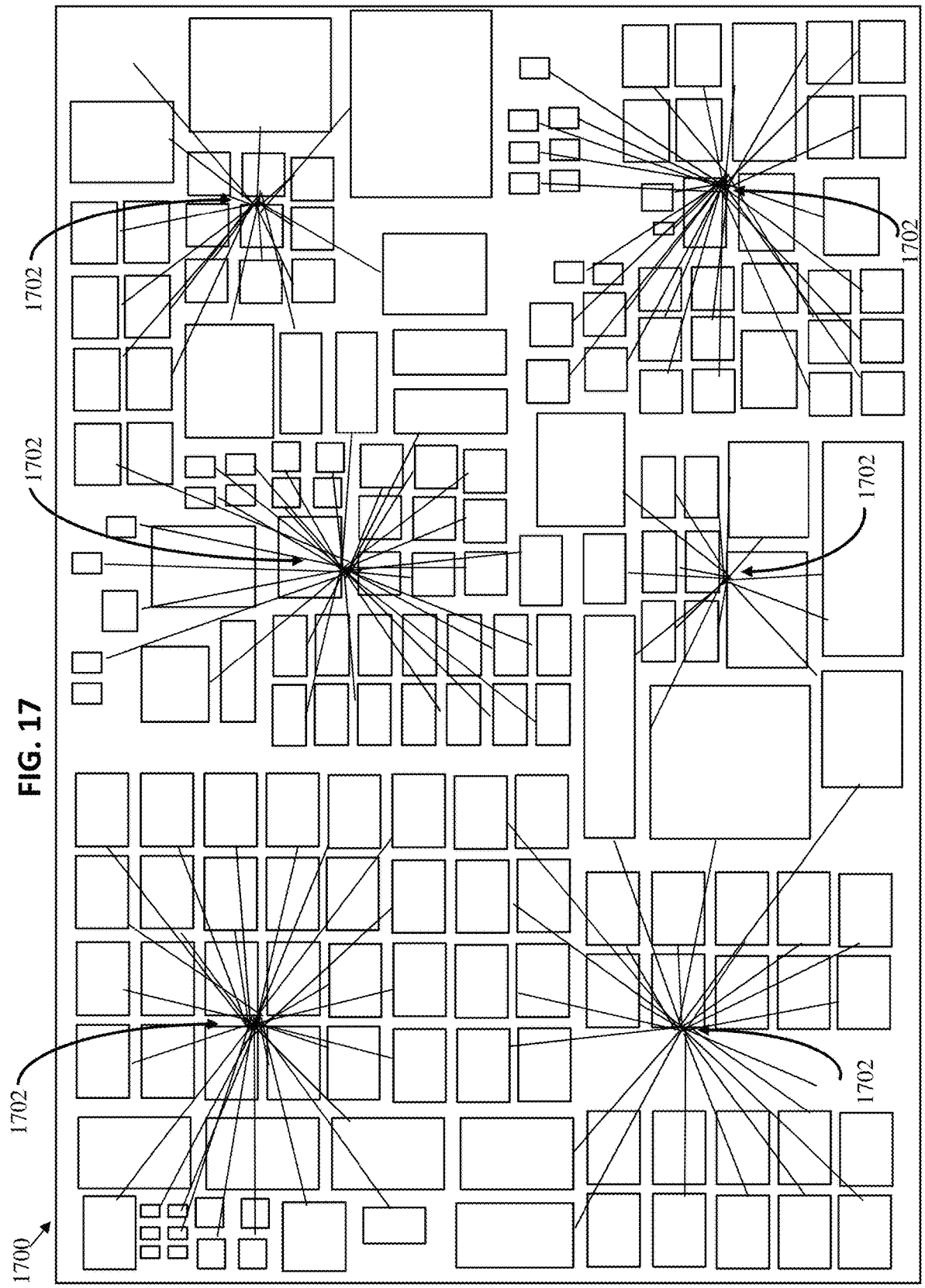
FIG. 17 depicts an example circuit design having local clock buffer controllers with improved placements in accordance with one or more embodiments of the present invention.
Figure 18:
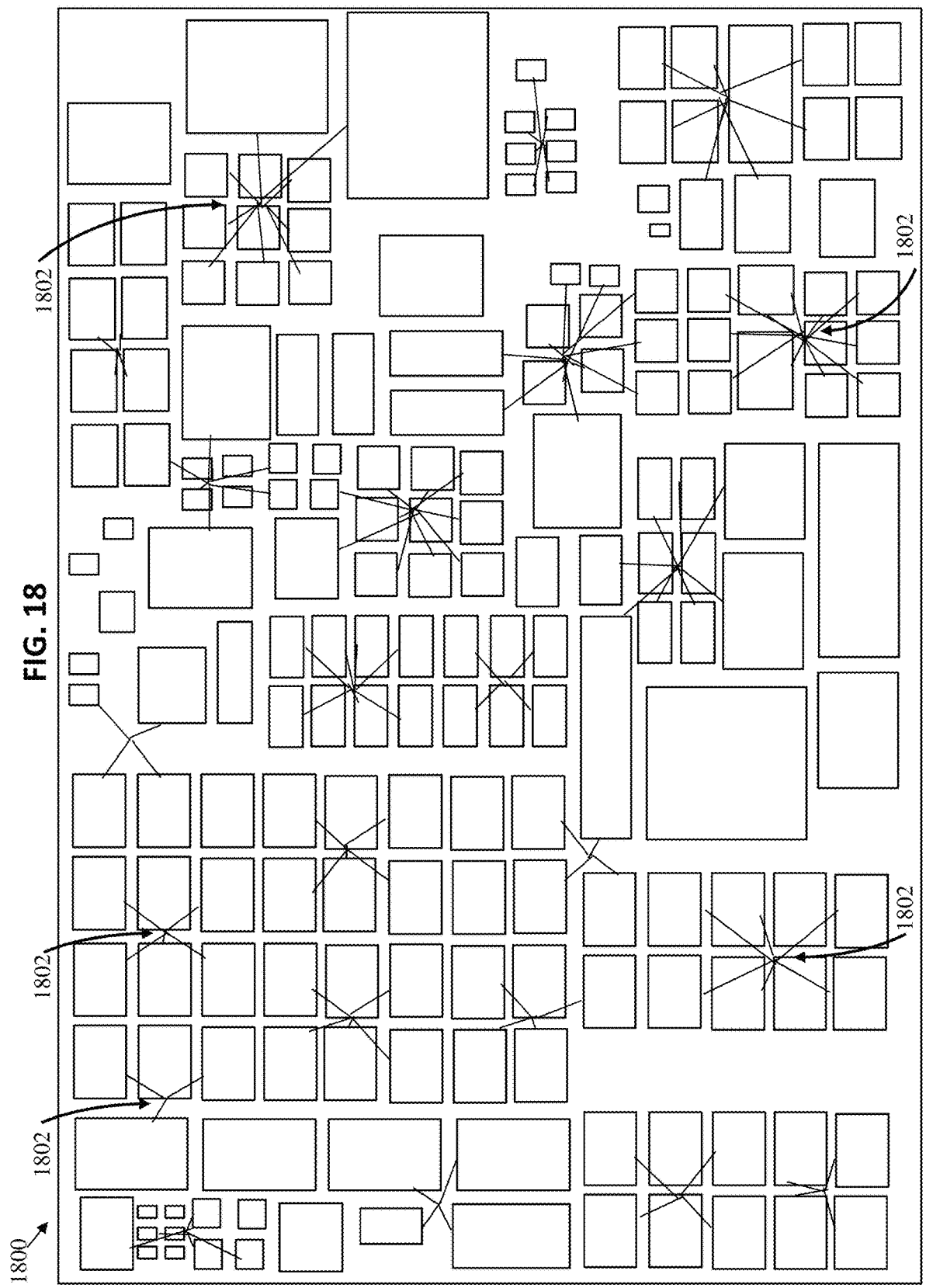
FIG. 18 depicts another example circuit design having local clock buffer controllers with improved placements in accordance with one or more embodiments of the present invention.

FIG. 17 depicts a system 1700 as an example circuit design that may result following the application of method 1500 to place various local clock buffer controllers 1702 about the circuit design. When compared to FIG. 14 in which the local clock buffer controllers 1406 are concentrated at the center of the system 1400 of the circuit design, it can be seen that distributing the placement of the local clock buffer controllers 1702 in this way can greatly reduce the overall length of nets needed to connect to the latches (e.g., via local clock buffers). FIG. 18 depicts system 1800 as another example circuit design that may result following the application of method 1500 but in a case where the circuit design includes many more local clock buffer controllers 1802 than the example shown in FIG. 17. As shown in FIG. 18, when a greater granularity of the distribution of local clock buffer controllers 1802 is achieved, the overall reduction in net length can be even greater, resulting in less complex design that can have better timing characteristics.

Figure 19:
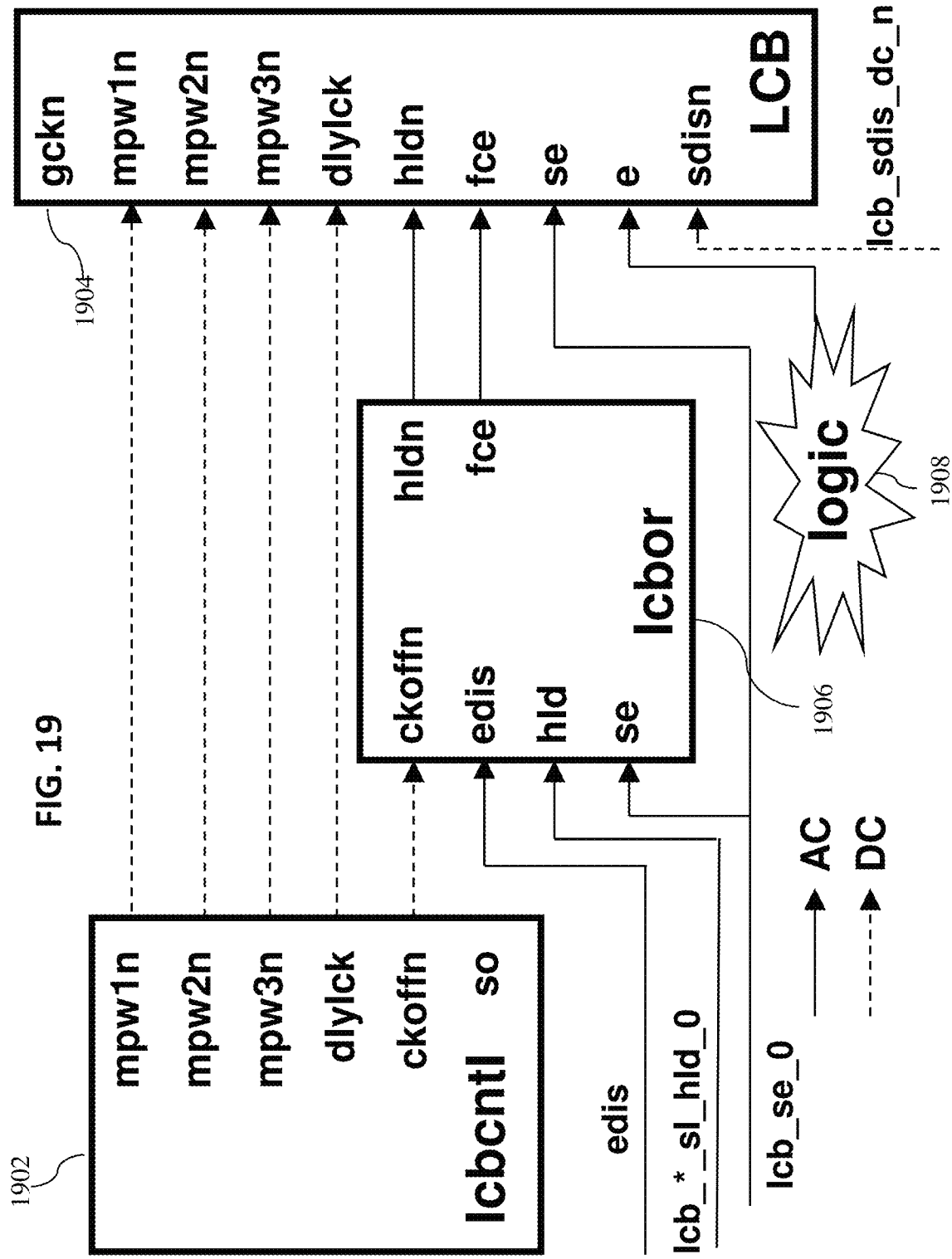
FIG. 19 is an example block diagram of connections between a local clock buffer controller and a local clock buffer in accordance with one or more embodiments of the present invention.

FIG. 19 depicts an example block diagram of connections between a local clock buffer controller 1902 and a local clock buffer (LCB) 1906 in accordance with one or more embodiments of the present invention. The local clock buffer controller 1902 and LCB 1906 can be representative of any of the local clock buffer controllers and LCBs (including LCBs 904) respectively discussed herein. According to some embodiments, the local clock buffer 1902 may pass some signals (e.g., mpw1n, mpwn2, mpw3n, dlylck) directly to the LCB 1906 and may pass at least one signal (e.g., ckoffn) to a local clock buffer OR (LCBOR) 1906, which can receive other inputs (e.g., edis, lcb_*_sl_hld_0, lcb_se_0) before passing signals (e.g., hldn, fce) on to the LCB 1904. The LCB 1908 may also receive signals from logic elements 1908 at inputs. Although not shown in FIG. 19, the LCB may output signals to a plurality of latches (i.e., the latches in a cluster that is associated with the local clock buffer controller 1902). Following placement of the local clock buffer controllers in a circuit diagram as discussed above, the software 111 may connect each local clock buffer controller 1902 to one or more LCBORs 1906 and LCBs 1904 that are connected to the latches of the associated latch cluster in a manner such as that shown in FIG. 19, or any other such suitable manner known in the art. According to some embodiments, connecting the local clock buffer controller 1902 to the LCB 1904 and LCBOR 1906 can include modifying connections listed in a netlist that provides pin connections between circuit elements to reflect the appropriate input and output connections between the elements. A netlist can be stored as part of an electronic file in computer system 100 that includes the circuit diagram, and which may be used to generate a physical integrated circuit as described below.

Figure 20:
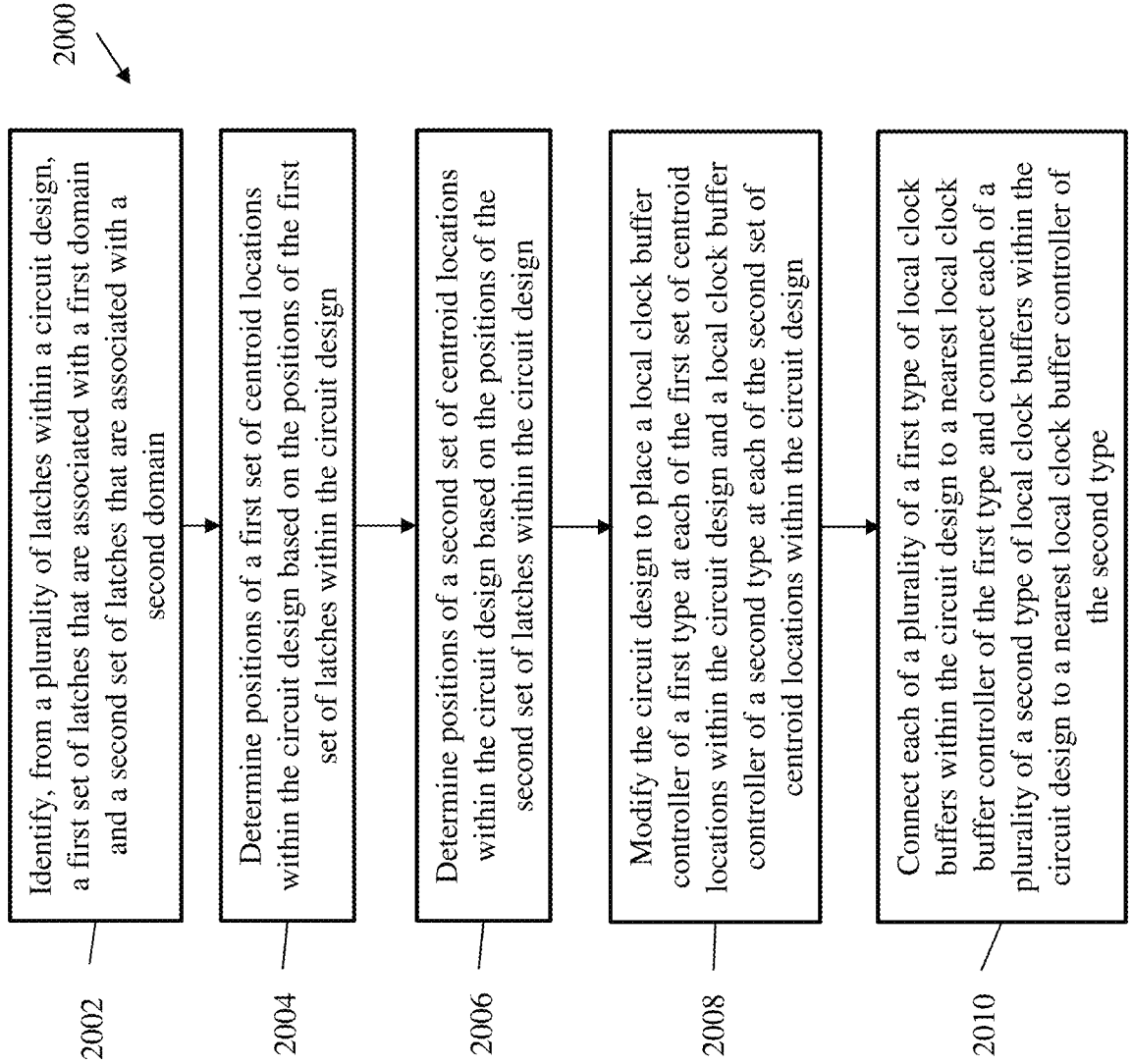
FIG. 20 is a flow diagram of another process for providing improved placement of local clock buffer controllers in accordance with one or more embodiments of the present invention.

Turning now to FIG. 20, a flow diagram of a method 2000 for providing improved placement of local clock buffer controllers in accordance with an embodiment is shown. In one or more embodiments of the present invention, the method 2000 may be embodied in software 111 that is executed by computer elements of computer 100 illustrated in FIG. 1, The method 2000 begins at block 2002 and includes identifying (e.g. via computer 100), from a plurality of latches within a IC design, a first set of latches that are associated with a first domain and a second set of latches that are associated with a second domain. For example, the first domain may be the functional clock domain and the second domain may be the test clock domain.

As shown at block 2004, the method 2000 includes determining (e.g. via computer 100) positions of a first set of centroid locations within the circuit design based on the positions of the first set of latches within the IC design, for example in a manner similar to that described above with respect to block 1502.

As shown at block 2006, the method 2000 includes determining (e.g. via computer 100) positions of a second set of centroid locations within the IC design based on the positions of the second set of latches within the circuit design, for example in a manner similar to that described above with respect to block 1502.

As shown at block 2008, the method includes modifying (e.g. via computer 100) the IC design to place a local clock buffer controller of a first type at each of the first set of centroid locations within the circuit design and a local clock buffer controller of a second type at each of the second set of centroid locations within the circuit design, for example in a manner similar to that described above with respect to block 1504.

As shown at block 2010, the method 2000 includes connecting (e.g. via computer 100) each of a plurality of a first type of local clock buffers within the circuit design to a nearest local clock buffer controller of the first type and connecting each of a plurality of a second type of local clock buffers within the circuit design to a nearest local clock buffer controller of the second type, for example in a manner similar to that described above with respect to block 1506.

Figure 21:
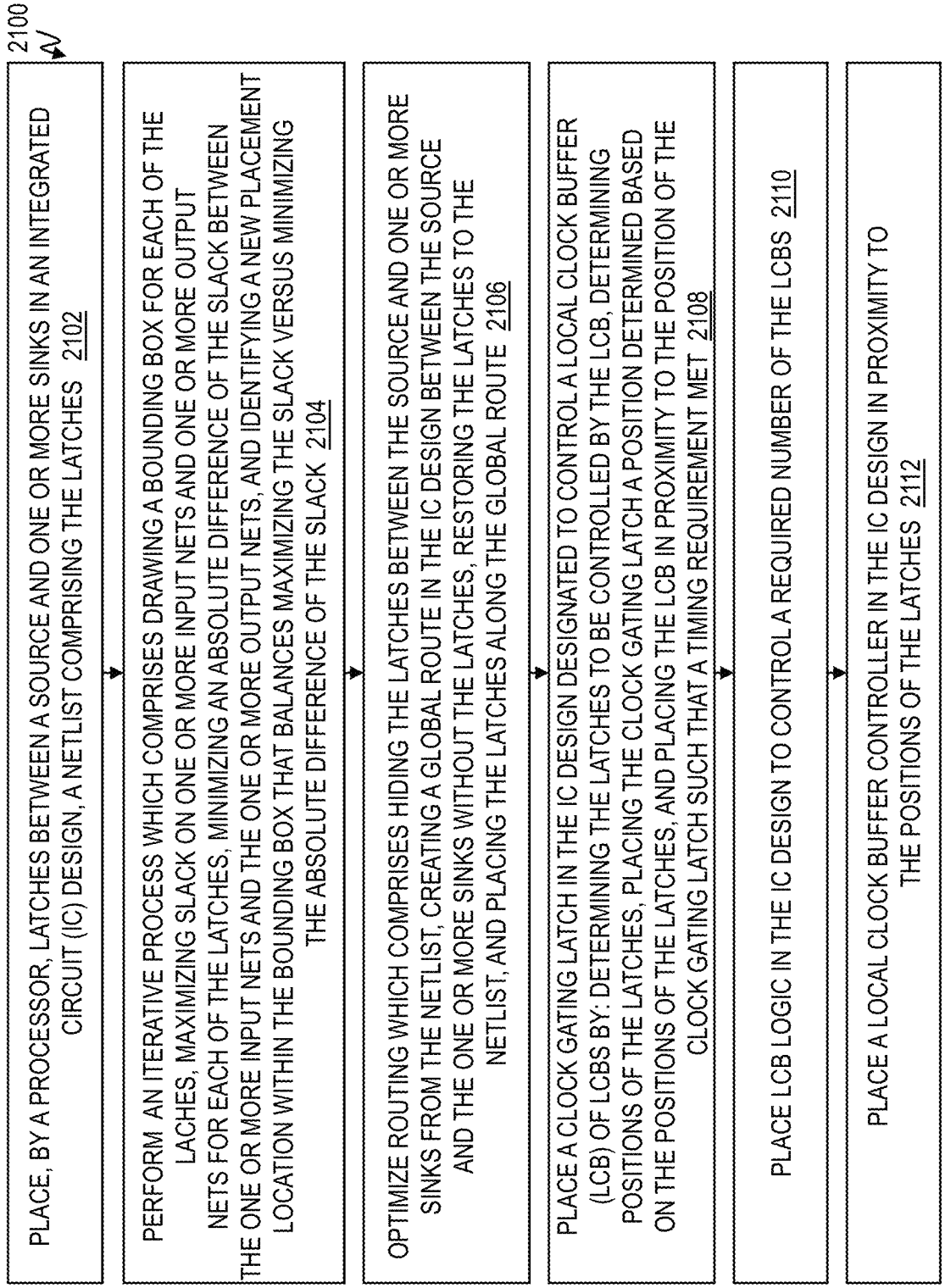
FIG. 21 is a flow diagram of a method for single-bit latch placement optimization for an integrated circuit (IC) design in accordance with one or more embodiments of the present invention.

FIG. 21 is a computer-implemented method for designing/building an integrated circuit design (e.g., IC diagram, layout, etc.,) according to one or more embodiments of the invention. Computer system 100 can be utilized to perform the method 2100, and the method 2100 may be implemented in software 111. Reference can be made to any combination of the figures discussed herein. At block 2102, computer system 100 is configured to place/insert latches between a source and one or more sinks in an integrated circuit (IC) design, a netlist comprising the latches. At block 2104, computer system 100 is configured to perform an iterative process which comprises drawing a bounding box for each of the latches, maximizing slack on one or more input nets and one or more output nets for each of the latches, minimizing an absolute difference of the slack between the one or more input nets and the one or more output nets, and identifying a new placement location within the bounding box that balances maximizing the slack versus minimizing the absolute difference of the slack.

At block 2106, computer system 100 is configured to optimize routing which comprises hiding the latches between the source and one or more sinks from the netlist, creating a global route in the IC design between the source and the one or more sinks without the latches, restoring the latches to the netlist, and placing the latches along the global route. At block 2108, computer system 100 is configured to place/insert a clock gating latch in the IC design designated to control a local clock buffer (LCB) of LCBs by: determining the latches to be controlled by the LCB, determining positions of the latches, placing the clock gating latch a position determined based on the positions of the latches, and placing the LCB in proximity to the position of the clock gating latch such that a timing requirement met. At block 2110, computer system 100 is configured to place/insert LCB logic in the IC design to control a required number of the LCBs. At block 2112, computer system 100 is configured place/insert a local clock buffer controller in the IC design in proximity to the positions of the latches.

Figure 22:
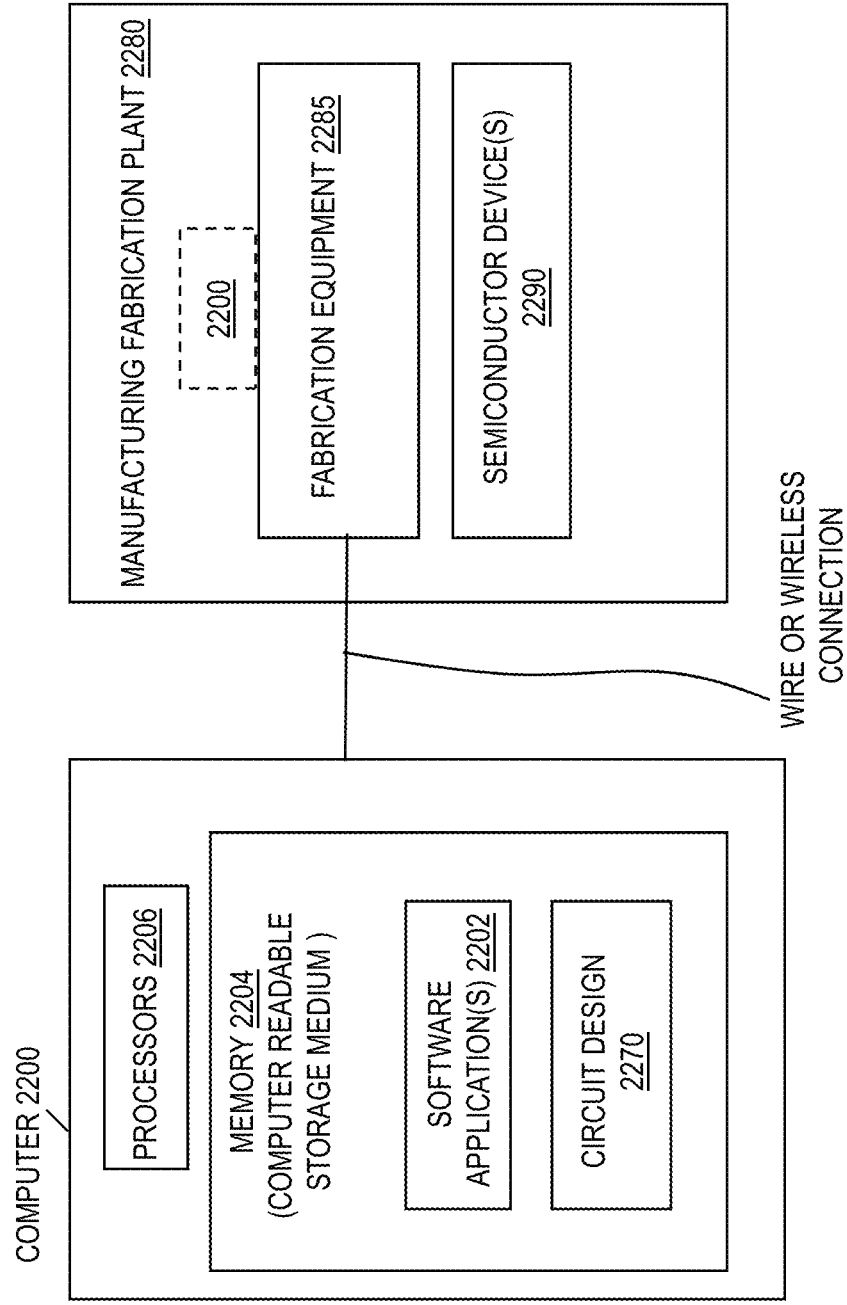
FIG. 22 depicts a system of a computer system integrated with a manufacturing fabrication plant in accordance with one or more embodiments of the present invention.

In one or more embodiments of the invention, a semiconductor layout (or IC design) can be generated using the computer system 2200 shown in FIG. 22. The computer system 2200 has one or more software applications 2202 configured to function and implement operations as discussed herein. For example, software applications 2202 (as discussed herein for software 111 of computer system 100) may include one or more routines for placing, moving, configuring, and optimizing all types of latches, gates, local clock buffers, local clock buffer logic (LCBOR), local clock buffer controls, etc., for an IC design. A semiconductor layout can be constructed by the software application 2202 of the computer 2200 according to combinations of methods, systems, IC designs, etc., discussed in FIGS. 1-21 as described above to build the semiconductor device 2290 (e.g., an integrated circuit). The computer 2200 is configured to guarantee design rule cleanliness (i.e., pass) for the semiconductor device before and/or without requiring a design rule check. The software applications 2202 include, integrate, are coupled to, and/or function as electronic design automation (EDA), also referred to as electronic computer-aided design (ECAD). Electronic design automation is a category of software tools for designing electronic systems such as integrated circuits and printed circuit boards. The tools work together in a design flow that chip designers use to design and analyze entire semiconductor chips. In some implementations, the computer 2200 is coupled to, integrated with, and/or part of the fabrication equipment 2285 at the manufacturing fabrication plant 2280 (so as to communicate with and/or control operations of the fabrication equipment 2285) to thereby fabricate semiconductor device(s) 2290 as depicted in FIG. 22, as understood by one skilled in the art. The computer 2200 includes one or processors 2206 configured to execute one or more software applications 2202 in memory 2204. The computer 2200 receives input of a design 2270 for the semiconductor device 2290, and the computer 2200 is configured to develop/form the semiconductor layout for the semiconductor device in order to build the semiconductor device. The semiconductor layout is a physical design released to the manufacturing fabrication (Fab) plant 2280 and physically fabricated by the fabrication equipment 2285 to produce the semiconductor device 2290. The manufacturing fabrication plant 2280 builds the photo mask from the semiconductor layout as a physical design, and then builds the actual product using the photo mask. The product is an integrated circuit (i.e., semiconductor device 2290) on a wafer according to the semiconductor layout (physical design). There may be numerous integrated circuits on a wafer, and each integrated circuit may be diced into an individual chip.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention.

In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   placing, by a processor, latches between a source and one or more sinks in an integrated circuit (IC) design, a netlist comprising the latches;
   performing an iterative process which comprises drawing a bounding box for each of the latches, maximizing a slack on one or more input nets and one or more output nets for each of the latches, minimizing an absolute difference of the slack between the one or more input nets and the one or more output nets, and identifying a new placement location within the bounding box that balances maximizing the slack versus minimizing the absolute difference of the slack;
   optimizing routing which comprises hiding the latches between the source and one or more sinks from the netlist, creating a global route in the IC design between the source and the one or more sinks without the latches, restoring the latches to the netlist, and placing the latches along the global route;
   placing a clock gating latch in the IC design designated to control a local clock buffer (LCB) of LCBs by: determining the latches to be controlled by the LCB, determining positions of the latches, placing the clock gating latch a position determined based on the positions of the latches, and placing the LCB in proximity to the position of the clock gating latch such that a timing requirement met;
   placing a LCB logic in the IC design to control a required number of the LCBs; and
   placing a local clock buffer controller in the IC design in proximity to the positions of the latches.

2. The computer-implemented method of claim 1, wherein performing the iterative process further comprises:
   selecting a selected latch of a current level of connectivity, the latches being ordered a level of connectivity from the source to the one or more sinks;
   drawing the bounding box around the selected latch to encompass the one or more input nets and the one or more output nets for the selected latch;
   using a two-dimensional optimizer to find the new placement location for the selected latch by solving for optimization criteria.

3. The computer-implemented method of claim 2, wherein the optimization criteria comprises maximizing the slack on the one or more input nets and the one or more output nets of the selected latch, minimizing the absolute difference of the slack between the one or more input nets and the one or more output nets of the selected latch, and identifying the new placement location within the bounding box that balances maximizing the slack on the one or more input nets and the one or more output nets versus minimizing the absolute difference of the slack between the one or more input nets and the one or more output nets.

4. The computer-implemented method of claim 2, wherein performing the iterative process further comprises:
   updating a current location of the selected latch between the source and the one or more sinks to be the new placement location identified within the bounding box;
   repeating the iterative process for each of the latches in the current level of the connectivity; and
   proceeding to performing the iterative process for the latches in a next level of the connectivity.

5. The computer-implemented method of claim 1, wherein hiding the latches between the source and one or more sinks from the netlist comprises saving a name and a connectivity of each latch of the of the latches.

6. The computer-implemented method of claim 5, wherein placing the latches along the global route comprises dividing the global route into a number of global route segments corresponding to a number of the latches to be placed.

7. The computer-implemented method of claim 1, wherein:
   the clock gating latch designated to control the LCB is identified in the netlist by having an output pin of the clock gating latch connected to a specified input pin of the LCB; and
   determining the latches to be controlled by the LCB comprises determining, based on the netlist, that output pins of the LCB are connected to input pins of the latches.

8. A system comprising:
   a memory having computer readable instructions; and
   one or more processors for executing the computer readable instructions, the computer readable instructions controlling the one or more processors to perform operations comprising:
   placing, by the one or more processor, latches between a source and one or more sinks in an integrated circuit (IC) design, a netlist comprising the latches;
   performing an iterative process which comprises drawing a bounding box for each of the latches, maximizing a slack on one or more input nets and one or more output nets for each of the latches, minimizing an absolute difference of the slack between the one or more input nets and the one or more output nets, and identifying a new placement location within the bounding box that balances maximizing the slack versus minimizing the absolute difference of the slack;
   optimizing routing which comprises hiding the latches between the source and one or more sinks from the netlist, creating a global route in the IC design between the source and the one or more sinks without the latches, restoring the latches to the netlist, and placing the latches along the global route;

placing a clock gating latch in the IC design designated to control a local clock buffer (LCB) of LCBs by: determining the latches to be controlled by the LCB, determining positions of the latches, placing the clock gating latch a position determined based on the positions of the latches, and placing the LCB in proximity to the position of the clock gating latch such that a timing requirement met;

placing a LCB logic in the IC design to control a required number of the LCBs; and placing a local clock buffer controller in the IC design in proximity to the positions of the latches.

9. The system of claim 8, wherein performing the iterative process further comprises:

selecting a selected latch of a current level of connectivity, the latches being ordered a level of connectivity from the source to the one or more sinks;

drawing the bounding box around the selected latch to encompass the one or more input nets and the one or more output nets for the selected latch;

using a two-dimensional optimizer to find the new placement location for the selected latch by solving for optimization criteria.

10. The system of claim 9, wherein the optimization criteria comprises maximizing the slack on the one or more input nets and the one or more output nets of the selected latch, minimizing the absolute difference of the slack between the one or more input nets and the one or more output nets of the selected latch, and identifying the new placement location within the bounding box that balances maximizing the slack on the one or more input nets and the one or more output nets versus minimizing the absolute difference of the slack between the one or more input nets and the one or more output nets.

11. The system of claim 9, wherein performing the iterative process further comprises:

updating a current location of the selected latch between the source and the one or more sinks to be the new placement location identified within the bounding box;

repeating the iterative process for each of the latches in the current level of the connectivity; and proceeding to performing the iterative process for the latches in a next level of the connectivity.

12. The system of claim 8, wherein hiding the latches between the source and one or more sinks from the netlist comprises saving a name and a connectivity of each latch of the of the latches.

13. The system of claim 12, wherein placing the latches along the global route comprises dividing the global route into a number of global route segments corresponding to a number of the latches to be placed.

14. The system of claim 8, wherein:

the clock gating latch designated to control the LCB is identified in the netlist by having an output pin of the clock gating latch connected to a specified input pin of the LCB; and determining the latches to be controlled by the LCB comprises determining, based on the netlist, that output pins of the LCB are connected to input pins of the latches.

15. A computer program product comprising a computer readable storage medium having program instructions embodied therewith, the program instructions executable by a processor to cause the processor to perform operations comprising:

placing, by a processor, latches between a source and one or more sinks in an integrated circuit (IC) design, a netlist comprising the latches;

performing an iterative process which comprises drawing a bounding box for each of the latches, maximizing a slack on one or more input nets and one or more output nets for each of the latches, minimizing an absolute difference of the slack between the one or more input nets and the one or more output nets, and identifying a new placement location within the bounding box that balances maximizing the slack versus minimizing the absolute difference of the slack;

optimizing routing which comprises hiding the latches between the source and one or more sinks from the netlist, creating a global route in the IC design between the source and the one or more sinks without the latches, restoring the latches to the netlist, and placing the latches along the global route;

placing a clock gating latch in the IC design designated to control a local clock buffer (LCB) of LCBs by: determining the latches to be controlled by the LCB, determining positions of the latches, placing the clock gating latch a position determined based on the positions of the latches, and placing the LCB in proximity to the position of the clock gating latch such that a timing requirement met;

placing a LCB logic in the IC design to control a required number of the LCBs; and placing a local clock buffer controller in the IC design in proximity to the positions of the latches.

16. The computer program product of claim 15, wherein performing the iterative process further comprises:

selecting a selected latch of a current level of connectivity, the latches being ordered a level of connectivity from the source to the one or more sinks;

drawing the bounding box around the selected latch to encompass the one or more input nets and the one or more output nets for the selected latch;

using a two-dimensional optimizer to find the new placement location for the selected latch by solving for optimization criteria.

17. The computer program product of claim 16, wherein the optimization criteria comprises maximizing the slack on the one or more input nets and the one or more output nets of the selected latch, minimizing the absolute difference of the slack between the one or more input nets and the one or more output nets of the selected latch, and identifying the new placement location within the bounding box that balances maximizing the slack on the one or more input nets and the one or more output nets versus minimizing the absolute difference of the slack between the one or more input nets and the one or more output nets.

18. The computer program product of claim 16, wherein performing the iterative process further comprises:

updating a current location of the selected latch between the source and the one or more sinks to be the new placement location identified within the bounding box;

repeating the iterative process for each of the latches in the current level of the connectivity; and proceeding to performing the iterative process for the latches in a next level of the connectivity.

19. The computer program product of claim 15, wherein hiding the latches between the source and one or more sinks from the netlist comprises saving a name and a connectivity of each latch of the of the latches.

20. The computer program product of claim 19, wherein placing the latches along the global route comprises dividing the global route into a number of global route segments corresponding to a number of the latches to be placed.

* * * * *